(12) United States Patent
Lipowitch et al.

(10) Patent No.: US 12,202,207 B2
(45) Date of Patent: Jan. 21, 2025

(54) SYSTEM AND METHOD FOR THREE-DIMENSIONAL PRINTING

(71) Applicant: STRATASYS LTD., Rehovot (IL)

(72) Inventors: Shai Lipowitch, Petach Tikva (IL); Yoav Bressler, Tel-Aviv (IL); Shahar Klinger, Rehovot (IL); Yosef Meller, Even Yehuda (IL)

(73) Assignee: STRATASYS LTD., Rehovot (IL)

( * ) Notice: Subject to any disclaimer, the term of this patent is extended or adjusted under 35 U.S.C. 154(b) by 0 days.

(21) Appl. No.: 18/121,721

(22) Filed: Mar. 15, 2023

(65) Prior Publication Data

US 2023/0234297 A1 Jul. 27, 2023

Related U.S. Application Data

(63) Continuation of application No. 17/618,474, filed as application No. PCT/IL2020/050118 on Jan. 30, 2020, now Pat. No. 11,633,919.

(Continued)

(51) Int. Cl.
*B29C 64/393* (2017.01)
*B29C 64/112* (2017.01)
(Continued)

(52) U.S. Cl.
CPC .......... *B29C 64/393* (2017.08); *B29C 64/112* (2017.08); *B29C 64/209* (2017.08);
(Continued)

(58) Field of Classification Search
CPC ... B29C 64/393; B29C 64/112; B29C 64/209; B33Y 50/02; B33Y 10/00; B33Y 30/00;
(Continued)

(56) References Cited

U.S. PATENT DOCUMENTS 6,853,464 B1 2/2005 Ueda et al.
9,738,033 B2 8/2017 Kritchman
(Continued)

FOREIGN PATENT DOCUMENTS

GB 2541163 2/2017
WO WO 2015/178443 11/2015
(Continued)

OTHER PUBLICATIONS

Pei-Li Sun et al; Color Uniformity Improvement for an Inkjet Color 3D printing system; Electronic Imaging; vol. 2016; No. 20; Feb. 14, 2016.
(Continued)

*Primary Examiner* — Yuhui R Pan
(74) *Attorney, Agent, or Firm* — PEARL COHEN ZEDEK LATZER BARATZ LLP

(57) ABSTRACT

Methods and systems are disclosed for selecting a print head of a 3D printing machine to apply 3D printing material at one or more positions in a printed 3D object. Embodiments of the present invention may include, in the selection process one or more elements pertaining for example to: geometry of the received 3D model; colorization of the received 3D model; transparency of the received 3D model; properties of the 3D printing material; and constraints of the 3D printing machine.

9 Claims, 12 Drawing Sheets

Related U.S. Application Data

(60) Provisional application No. 62/860,564, filed on Jun. 12, 2019.

(51) Int. Cl.
 *B29C 64/209* (2017.01)
 *B33Y 50/02* (2015.01)
 *B33Y 10/00* (2015.01)

(52) U.S. Cl.
 CPC ...... *B33Y 50/02* (2014.12); *B29K 2995/0021* (2013.01); *B33Y 10/00* (2014.12)

(58) Field of Classification Search
 CPC ... B33Y 50/00; B29K 2995/0021; H04N 1/60
 See application file for complete search history.

(56) References Cited

U.S. PATENT DOCUMENTS

| | | | |
|---|---|---|---|
| 10,065,376 B2 | 9/2018 | Hakkaku | |
| 10,703,040 B2 | 7/2020 | Nagahari et al. | |
| 2004/0046831 A1 | 3/2004 | Hempel | |
| 2006/0250427 A1* | 11/2006 | Kroon | H04N 1/54 347/9 |
| 2008/0007802 A1 | 1/2008 | Viturro et al. | |
| 2010/0021053 A1 | 1/2010 | Taylor et al. | |
| 2016/0001504 A1 | 1/2016 | Ikeda et al. | |
| 2016/0339643 A1 | 11/2016 | Dikovsky et al. | |
| 2017/0013173 A1* | 1/2017 | Bellert | H04N 1/6025 |
| 2017/0151726 A1 | 6/2017 | Ikeda et al. | |
| 2017/0165919 A1 | 6/2017 | Ohi et al. | |
| 2017/0291373 A1 | 10/2017 | Hara | |
| 2017/0313048 A1 | 11/2017 | Hakkaku et al. | |
| 2018/0104899 A1* | 4/2018 | Matsubara | H04N 1/52 |
| 2018/0111323 A1 | 4/2018 | Harayama | |
| 2018/0117847 A1 | 5/2018 | Ohi | |
| 2018/0117856 A1 | 5/2018 | Ochi | |
| 2018/0126664 A1 | 5/2018 | Okawa | |
| 2018/0147838 A1 | 5/2018 | Harayama | |
| 2018/0150263 A1 | 5/2018 | Harayama | |
| 2018/0162056 A1 | 6/2018 | Kaneko et al. | |
| 2018/0169936 A1 | 6/2018 | Harayama | |
| 2018/0178444 A1 | 6/2018 | Hakkaku | |
| 2018/0250883 A1 | 9/2018 | Nagahari et al. | |
| 2018/0304546 A1 | 10/2018 | Hakkaku et al. | |
| 2019/0022756 A1 | 1/2019 | Ohnishi | |
| 2019/0043268 A1 | 2/2019 | Harayama et al. | |
| 2019/0270136 A1 | 9/2019 | Gibson | |
| 2022/0288860 A1 | 9/2022 | Lipowitch et al. | |

FOREIGN PATENT DOCUMENTS

| | | |
|---|---|---|
| WO | WO 2015/199019 | 12/2015 |
| WO | WO 2016/163391 | 10/2016 |
| WO | WO 2016/167239 | 10/2016 |
| WO | WO 2016/167240 | 10/2016 |
| WO | WO 2016/190342 | 12/2016 |
| WO | WO 2017/069245 | 4/2017 |
| WO | WO 2017/147412 | 8/2017 |
| WO | WO 2018/022077 | 2/2018 |
| WO | WO 2019/043696 | 3/2019 |

OTHER PUBLICATIONS

Search Report dated Nov. 25, 2019 for International Patent Application No. PCT/IL2019/050860.
Search Report dated Apr. 20, 2020 for International Patent Application No. PCT/IL2020/050118.
Office Action dated Aug. 25, 2022 for U.S. Appl. No. 17/618,474.
Notice of Allowance dated Dec. 9, 2022 for U.S. Appl. No. 17/618,474.
Notice of Allowance dated Dec. 22, 2022 for U.S. Appl. No. 17/618,474.

* cited by examiner

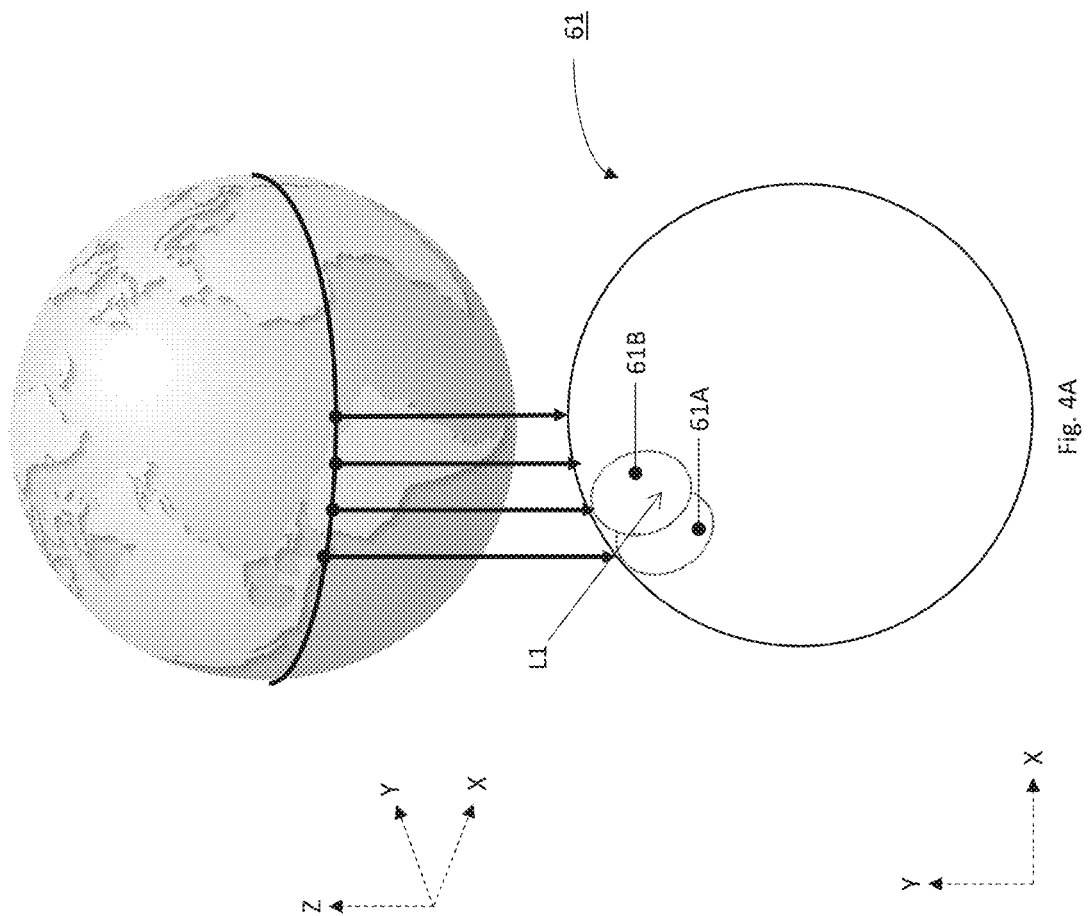

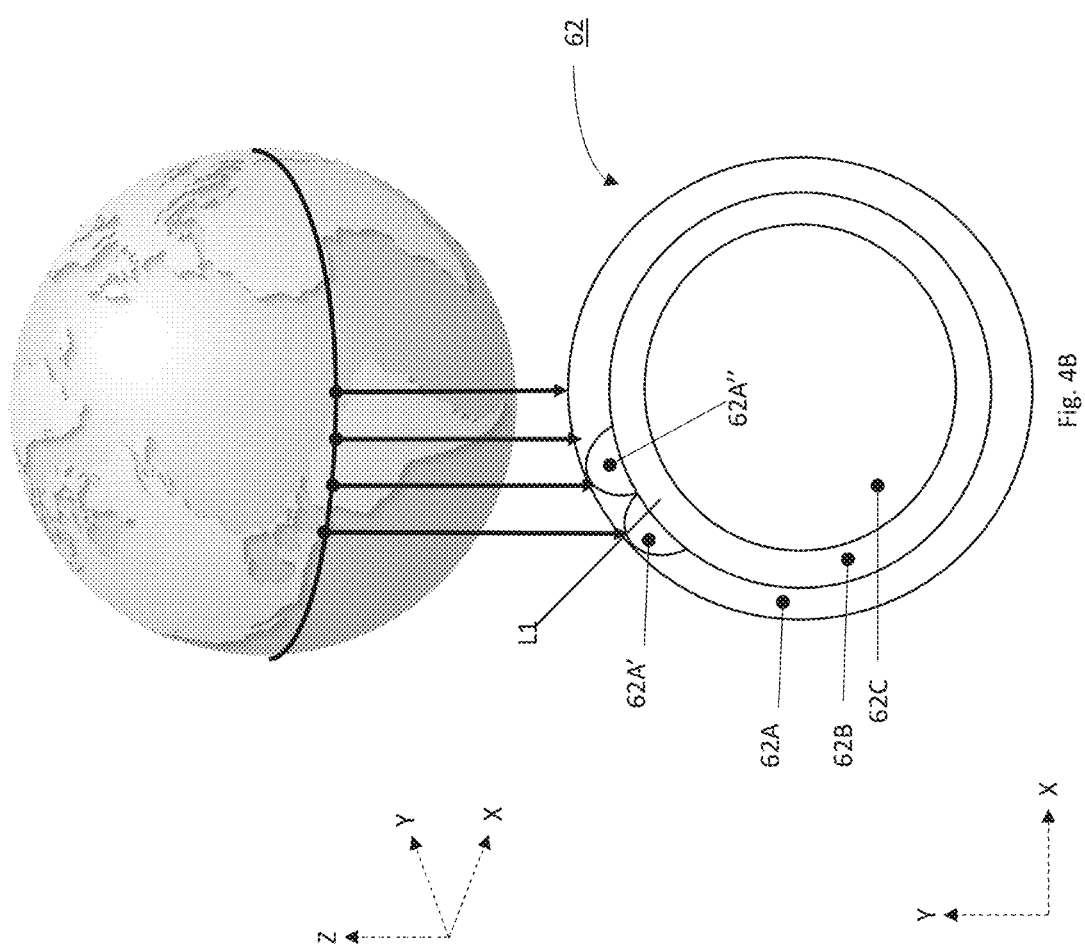

SYSTEM AND METHOD FOR THREE-DIMENSIONAL PRINTING

CROSS-REFERENCE TO RELATED APPLICATIONS

This application is a Continuation Patent Application of U.S. patent application Ser. No. 17/618,474, filed Dec. 12, 2021, which is a National Phase Application of PCT International Application No. PCT/IL2020/050118. International Filing Date Jan. 30, 2020, claiming the benefit of U.S. Patent Application No. 62/860,564, filed Jun. 12, 2019, all of which are hereby incorporated by reference.

FIELD OF THE INVENTION

The present invention relates generally to three-dimensional (3D) printing systems. More specifically, the present invention relates to systems and methods for 3D printing objects with a selected print head.

BACKGROUND OF THE INVENTION

Systems for 3D printing have become ubiquitous in both industrial and private sectors and are commonly used to produce custom-made 3D objects from a variety of materials and substances.

Inkjet-based 3D printing systems encounter similar challenges and obstacles as their 2D predecessors, with additional complexity derived from the 3D volumetric nature of the printed objects.

For example, in contrast to 2D printing of text or image on a sheet of paper, characteristics of a 3D printed object such as the object's transparency, reflectiveness and colorization may be affected by the object's geometric properties, properties of the 3D printing material (e.g., 3D printing ink) and position of printing points in relation to one another in the 3D environment.

As known in the art, 3D printers normally receive a data element that may describe or represent a 3D model for printing. The received data element may include a shell, defining the shape or geometry of the 3D model. The shell may include a plurality of shell points, each point being characterized by a spatial localization and a color definition. The 3D printer may analyze the received data to produce slices of the 3D model and print a 3D object, one slice after another, based on the shape of the 3D model and the color of each such shell point.

However, state-of-the-art systems of 3D printing may not take into consideration elements of the printed 3D model and/or elements of the 3D printing material, as explained herein, in the selection of the printing material. This may lead to various impairments in the printed object. Such impairments may include, for example inaccuracies in the perceived color of elements in the printed object and distortion of shapes of colored elements that are included in the printed object.

SUMMARY OF THE INVENTION

Embodiments of the present invention may include a system and a method of selecting a print head of a 3D printing machine to apply 3D printing material at one or more positions in a printed 3D object. Embodiments of the present invention may include in the selection process one or more elements pertaining for example to: geometry of the received 3D model; a required colorization of the received 3D model; a required transparency of the received 3D model; properties of the 3D printing material; and constraints of the 3D printing machine, as elaborated herein.

Embodiments of the present invention may include a method of selecting, by one or more processor, a print head of a 3D printing machine. Embodiments of the method may include: receiving a shell data element corresponding to a 3D geometric shape of an object, where the shell data element may include a plurality of shell points and a respective plurality of source colorization vectors; producing a plurality of slice elements, corresponding to respective planar slices of the 3D geometric shape; for one or more slices, defining a colorization envelope at the contour of the slice, that may include a plurality of colorization points (CPs) aligned in a printing grid of the 3D printing machine; for one or more CPs, determining, by a predefined distance metric, a closest shell point among a plurality of shell points; for one or more CPs, attributing a target colorization vector to the one or more CPs, based on the source colorization vector of the determined closest shell point; and for one or more CPs, selecting a printing head, based on the attributed target colorization vector.

According to some embodiments of the invention, attributing a target colorization vector may include: receiving a profile function pertaining to one or more printing materials of the 3D printing machine; and using the profile function to convert the source colorization vector to the target colorization vector.

According to some embodiments of the invention, the source colorization vector may be a probabilistic vector, that may include red, green and blue (RGB) base colors, and the target colorization vector may be a probabilistic vector that may include cyan, magenta, yellow and black (CMYK) base colors.

According to some embodiments of the invention, attributing a target colorization vector to a CP may include: receiving one or more profile functions pertaining to one or more printing materials of the 3D printing machine; using the one or more profile functions to convert the source colorization vector to a first intermediary colorization vector, receiving one or more color normalization data elements pertaining to one or more printing materials of the 3D printing machine; and using the one or more color normalization data elements to normalize one or more components of first intermediary colorization vector, so as to convert the first intermediary colorization vector to a target colorization vector.

According to some embodiments of the invention, the one or more profile functions may include a first profile function and a second profile function. The first profile function may be adapted to translate between a source colorization vector and the first intermediary colorization vector, and the second profile function may be adapted to be applied on one or more base colors of the intermediary colorization vector, to compensate for properties of one or more specific printing materials installed at the 3D printing machine.

The properties of the one or more printing materials may include, for example: clarity, opacity, saturation and/or hue of the printing materials.

According to some embodiments of the invention, the second profile function may be determined in relation to the specific one or more printing materials in a first training stage. The first training stage may include: performing a sample printing of at least one 3D object; receiving, form a colorimeter, at least one data element may include information pertaining to colorization of the printed 3D object; calculating a value of a gamut of the at least one 3D object;

and calculating a value of required compensation for one or more base colors so as to obtain a required or predefined gamut.

According to some embodiments of the invention, the source colorization vector may be a probabilistic RGB vector that may include components of probability pertaining to each base color (e.g., R, G and B) of the RGB vector, the first intermediary colorization vector may be a probabilistic CMYK vector, that may include components of probability pertaining to each base color of the first intermediary colorization vector (e.g., C, M. Y and K) and wherein the target colorization vector may be a probabilistic cyan, magenta, yellow, black and white (CMYKW) vector, may include components of probability pertaining to each base color of the target colorization vector (e.g., C, M, Y, K and W).

According to some embodiments of the invention, normalizing one or more components of first intermediary colorization vector may include: if a sum of probabilistic components C, M. Y and K of the CMYK first intermediary colorization vector may be below 100 percent, then assigning a 100 percent complement value to the W component of the CMYKW target colorization vector; and if a sum of probabilistic components C, M, Y and K of the CMYK first intermediary colorization vector exceeds 100 percent then downscaling each component of the CMYK vector according to the one or more color normalization data elements, so that values of C, M, Y and K components of the CMYKW target vector complement to 100 percent.

Additionally. or alternatively, normalizing one or more components of first intermediary colorization vector may include: calculating a first sum of probability components of the first intermediary colorization vector; for each base color component of the first intermediary colorization vector, multiplying the respective probability component with the proportion of that base color from the first sum; calculating a second sum of the products of said multiplications; and complementing the second sum with a white (W) component, up to 100%.

Additionally, or alternatively, normalizing one or more components of first intermediary colorization vector may include: for each base color component of the intermediary colorization vector 261B, calculating a complement of the relevant probability component to 100%; multiplying the calculated complement values of all base colors to obtain a probability of a W (white) component; calculating a sum of probability values of base color components of the intermediary colorization vector; and linearly normalizing the value of one or more base color components of the intermediary colorization vector, based on the sum of components as elaborated herein, so as to complement to 100% with the probability of the W component.

According to some embodiments of the invention, selecting a printing head for a CP may include: applying a dithering algorithm on the CMYKW target colorization vector to obtain a droplet color value that may be selected from a list consisting of: cyan, magenta, yellow, black and white; and selecting a print head corresponding to the selected droplet color value.

According to some embodiments of the invention, the dithering algorithm may include, for example, a maximal value selection dithering algorithm, a thresholding dithering algorithm, a random dithering algorithm, a patterning dithering algorithm, an ordered dithering algorithm (e.g. halftone dithering. Bayer dithering, Blue noise dithering as known in the art), an error diffusion dithering algorithm (e.g. Floyd-Steinberg dithering, Jarvis dithering. Stucki dithering. Burks dithering. Sierra dithering. Atkinson dithering. Gradient-based error diffusion dithering as known in the art) and any combination thereof.

According to some embodiments of the invention, the dithering algorithm may be a depth selection dithering algorithm, that may include the steps of: (a) for one or more CPs associated with a target colorization vector, defining a column of CPs that connects the CP and a corresponding closest shell point; (b) dividing the width of the colorization envelop along the column, to a plurality of sub-layers, according to values of probabilistic components of the target colorization vector; (c) attributing each sub-layer to a component of the target colorization vector: (d) producing a droplet color candidate value according to the location of the relevant CP in a sub-layer of the column; and (e) determining a droplet color value for the CP based on the droplet color candidate value.

According to some embodiments of the invention, the droplet color value may be determined to be equal to the color candidate value. Additionally, or alternatively, the droplet color value may be determined according to a probabilistic function, based on the color candidate value, and a corresponding component in the probabilistic target colorization vector, as elaborated herein.

According to some embodiments of the invention, an order of the plurality of sub-layers may be selected or determined during a second training stage. Said second training stage may include the steps of: (a) performing one or more test prints of one or more 3D test objects, where each test print corresponds to a different order of base colors among sub-layers; (b) for each 3D test object, measuring, by a colorimeter, a colorization of the 3D test object; (c) for each 3D test object, calculating a gamut data element, based on the measured colorization; and (d) selecting an order of base colors that corresponds to an optimal gamut among the one or more 3D test objects.

Embodiments of the invention may include: for one or more slices, defining a white envelope adjacent the colorization envelope of the slice, where the white envelope may include a plurality of white points aligned in a printing grid of the 3D printing machine; and for one or more white points, selecting a printing head of white printing ink material.

Embodiments of the invention may include: for one or more slices, defining a core region adjacent to the white envelope of the slice, may include a plurality of core points aligned in the printing grid of the 3D printing machine; and for one or more core points, selecting a printing head of printing material according to a printing head utilization scheme.

According to some embodiments of the invention, attributing a target colorization vector may include: receiving one or more profile functions pertaining to one or more printing materials of the 3D printing machine; using the one or more profile functions to convert the source colorization vector to a first intermediary colorization vector; receiving one or more color normalization data elements pertaining to one or more printing materials of the 3D printing machine; using the one or more color normalization data elements to normalize one or more components of first intermediary colorization vector, so as to convert the first intermediary colorization vector to a second intermediary colorization vector; receiving a transparency normalization data element, pertaining to one or more printing materials of the 3D printing machine; and using the transparency normalization data element to normalize one or more components of second intermediary colorization vector, so as to convert the second intermediary colorization vector to the target colorization vector.

According to some embodiments of the invention, the source colorization vector may be a probabilistic red, green, blue and alpha (RGB-α) vector, the first intermediary colorization vector may be a probabilistic CMYK vector, the second intermediary colorization vector may be a probabilistic CMYKW vector and the target colorization vector may be a probabilistic cyan, magenta, yellow, black, white and alpha (CMYKW-α) vector.

According to some embodiments of the invention, normalizing one or more components of first intermediary colorization vector may include: if a sum of probabilistic components C, M, Y and K of the CMYK first intermediary colorization vector may be below 100 percent then assigning a 100 percent complement value to a W component of the CMYKW second intermediary colorization vector, and if a sum of probabilistic components C, M, Y and K of the CMYK first intermediary colorization vector exceeds 100 percent then downscaling each component of the CMYK first intermediary colorization vector according to the one or more color normalization data elements, so that values of probabilistic components C, M, Y and K of the CMYKW second intermediary colorization vector complement to 100 percent.

According to some embodiments of the invention, converting the second intermediary colorization vector to the target colorization vector may include downscaling each component of the CMYKW second intermediary colorization vector according to the transparency normalization data element, so that values of the C, M, Y, K, W and a components of the target CMYKW-a vector complement to 100 percent.

According to some embodiments of the invention, selecting a printing head for a CP may include: applying a dithering algorithm on the CMYKW-a target colorization vector to obtain a droplet color value that may be selected from a list consisting of: cyan, magenta, yellow, black, white and transparent; and selecting a print head corresponding to the selected droplet color value.

Embodiments of the invention may include: for one or more slices, defining transparent core region adjacent the colorization envelope of the slice, the transparent core region may include a plurality of transparent points aligned in a printing grid of the 3D printing machine; and for one or more transparent points, selecting a printing head of transparent printing material.

Embodiments of the invention may include a system for selecting a print head of a 3D printing machine. Embodiments of the system may include: a non-transitory memory device, wherein modules of instruction code may be stored, and one or more processors associated with the memory device, and configured to execute the modules of instruction code.

Upon execution of said modules of instruction code, the one or more processors may be further configured to: receive a shell data element corresponding to a 3D geometric shape of an object, the shell data element may include a plurality of shell points and a respective plurality of source colorization vectors; produce a plurality of slice elements, corresponding to respective planar slices of the 3D geometric shape; for one or more slices, define a colorization envelope at the contour of the slice, may include a plurality of CPs aligned in a printing grid of the 3D printing machine; for one or more CPs, determining, by a predefined distance metric, a closest shell point among a plurality of shell points; for one or more CPs, attributing a target colorization vector to the one or more CPs, based on the source colorization vector of the determined closest shell point; and for one or more CPs, selecting a printing head, based on the attributed target colorization vector.

Embodiments of the invention may include a method for printing a 3D object with a printing machine that may include one or more print heads. Embodiments of the method may include: (a) selecting a print head; (b) depositing a printing material with the selected print head and/or printing channel; and (c) repeating steps (a) and (b) until the 3D object may be completed.

Embodiments of the invention may include an integrated machine that may include one or more print heads and a system for selecting a print head of the one or more print heads, as elaborated herein.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIG. 4A is a schematic drawing, depicting a slice element of a printed 3D object, that may include a colorization region, as known in the art;

FIG. 4B is a schematic drawing, depicting a slice element of an opaque, printed 3D object, according to some embodiments of the invention;

Figure 1:
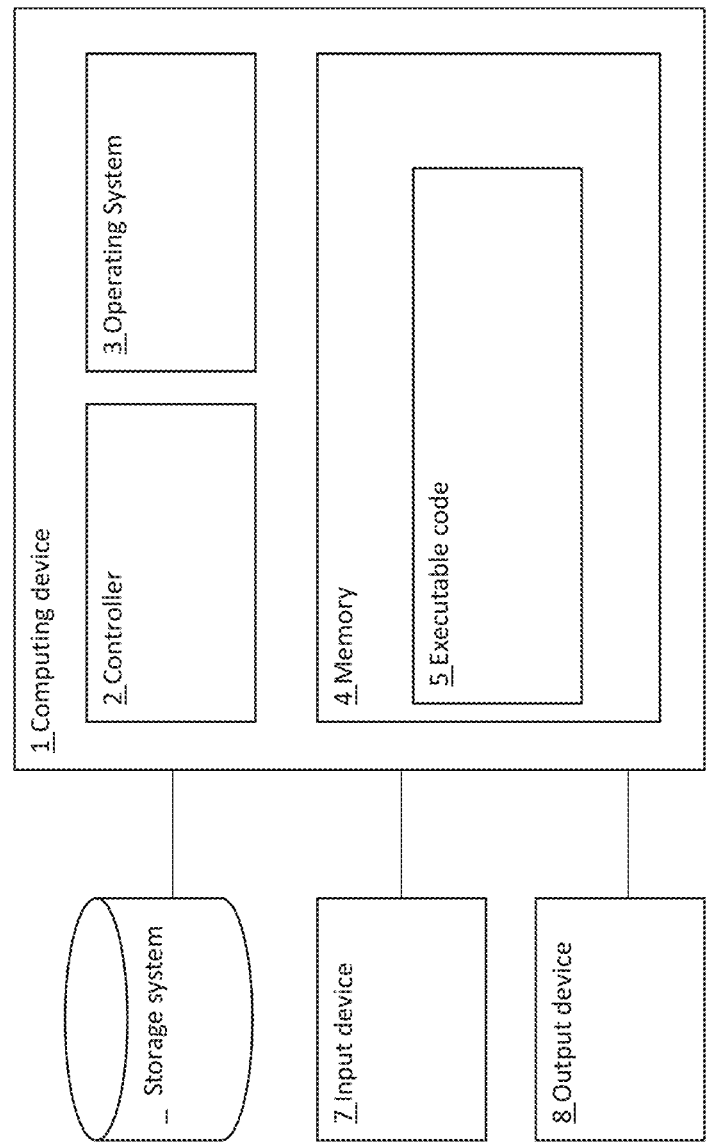
FIG. 1 is a block diagram, depicting a computing device which may be included in a system for selecting a print head of a 3D printing machine, according to some embodiments of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention. Some features or elements described with respect to one embodiment may be combined with features or elements described with respect to other embodiments. For the sake of clarity, discussion of same or similar features or elements may not be repeated.

Although embodiments of the invention are not limited in this regard, discussions utilizing terms such as, for example, "processing," "computing," "calculating." "determining," "establishing". "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that may store instructions to perform operations and/or processes.

Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. The term set when used herein may include one or more items. Unless explicitly stated, the method embodiments described herein are not constrained to a particular order or sequence. Additionally, some of the described method embodiments or elements thereof can occur or be performed simultaneously, at the same point in time, or concurrently.

The term "set" when used herein can include one or more items. Unless explicitly stated, the method embodiments described herein are not constrained to a particular order or sequence. Additionally, some of the described method embodiments or elements thereof can occur or be performed simultaneously, at the same point in time, or concurrently.

Embodiments of the present invention disclose a method and a system for selecting a print head of a 3D printer or printing machine.

Reference is now made to FIG. 1, which is a block diagram depicting a computing device, which may be included within an embodiment of a system for selecting a print head of a 3D printing machine, according to some embodiments.

Computing device 1 may include a controller 2 that may be, for example, a central processing unit (CPU) processor, a chip or any suitable computing or computational device, an operating system 3, a memory 4, executable code 5, a storage system 6, input devices 7 and output devices 8. Controller 2 (or one or more controllers or processors, possibly across multiple units or devices) may be configured to carry out methods described herein, and/or to execute or act as the various modules, units, etc. More than one computing device 1 may be included in, and one or more computing devices 1 may act as the components of, a system according to embodiments of the invention.

Operating system 3 may be or may include any code segment (e.g., one similar to executable code 5 described herein) designed and/or configured to perform tasks involving coordination, scheduling, arbitration, supervising, controlling or otherwise managing operation of Computing device 1, for example, scheduling execution of software programs or tasks or enabling software programs or other modules or units to communicate. Operating system 3 may be a commercial operating system. It will be noted that an operating system 3 may be an optional component, e.g., in some embodiments, a system may include a computing device that does not require or include an operating system 3.

Memory 4 may be or may include, for example, a Random Access Memory (RAM), a read only memory (ROM), a Dynamic RAM (DRAM), a Synchronous DRAM (SDRAM), a double data rate (DDR) memory chip, a Flash memory, a volatile memory, a non-volatile memory, a cache memory, a buffer, a short term memory unit, a long term memory unit, or other suitable memory units or storage units. Memory 4 may be or may include a plurality of, possibly different memory units. Memory 4 may be a computer or processor non-transitory readable medium, or a computer non-transitory storage medium, e.g., a RAM. In one embodiment, a non-transitory storage medium such as memory 4, a hard disk drive, another storage device, etc. may store instructions or code which when executed by a processor may cause the processor to carry out methods as described herein.

Executable code 5 may be any executable code, e.g., an application, a program, a process, task or script. Executable code 5 may be executed by controller 2 possibly under control of operating system 3. For example, executable code 5 may be an application that may select a print head of a 3D printing machine as further described herein. Although, for the sake of clarity, a single item of executable code 5 is shown in FIG. 1, a system according to some embodiments of the invention may include a plurality of executable code segments similar to executable code 5 that may be loaded into memory 4 and cause controller 2 to carry out methods described herein.

Storage system 6 may be or may include, for example, a flash memory as known in the art, a memory that is internal to, or embedded in, a micro controller or chip as known in the art, a hard disk drive, a CD-Recordable (CD-R) drive, a Blu-ray disk (BD), a universal serial bus (USB) device or other suitable removable and/or fixed storage unit. Content may be stored in storage system 6 and may be loaded from storage system 6 into memory 4 where it may be processed by controller 2. In some embodiments, some of the components shown in FIG. 1 may be omitted. For example, memory 4 may be a non-volatile memory having the storage capacity of storage system 6. Accordingly, although shown as a separate component, storage system 6 may be embedded or included in memory 4.

Input devices 7 may be or may include any suitable input devices, components or systems, e.g., a detachable keyboard or keypad, a mouse and the like. Output devices 8 may include one or more (possibly detachable) displays or monitors, speakers and/or any other suitable output devices. Any applicable input/output (I/O) devices may be connected to Computing device 1 as shown by blocks 7 and 8. For example, a wired or wireless network interface card (NIC), a universal serial bus (USB) device or external hard drive may be included in input devices 7 and/or output devices 8. It will be recognized that any suitable number of input devices 7 and output device 8 may be operatively connected to Computing device 1 as shown by blocks 7 and 8.

A system according to some embodiments of the invention may include components such as, but not limited to, a plurality of central processing units (CPU) or any other suitable multi-purpose or specific processors or controllers (e.g., controllers similar to controller 2), a plurality of input units, a plurality of output units, a plurality of memory units, and a plurality of storage units.

Figure 2:
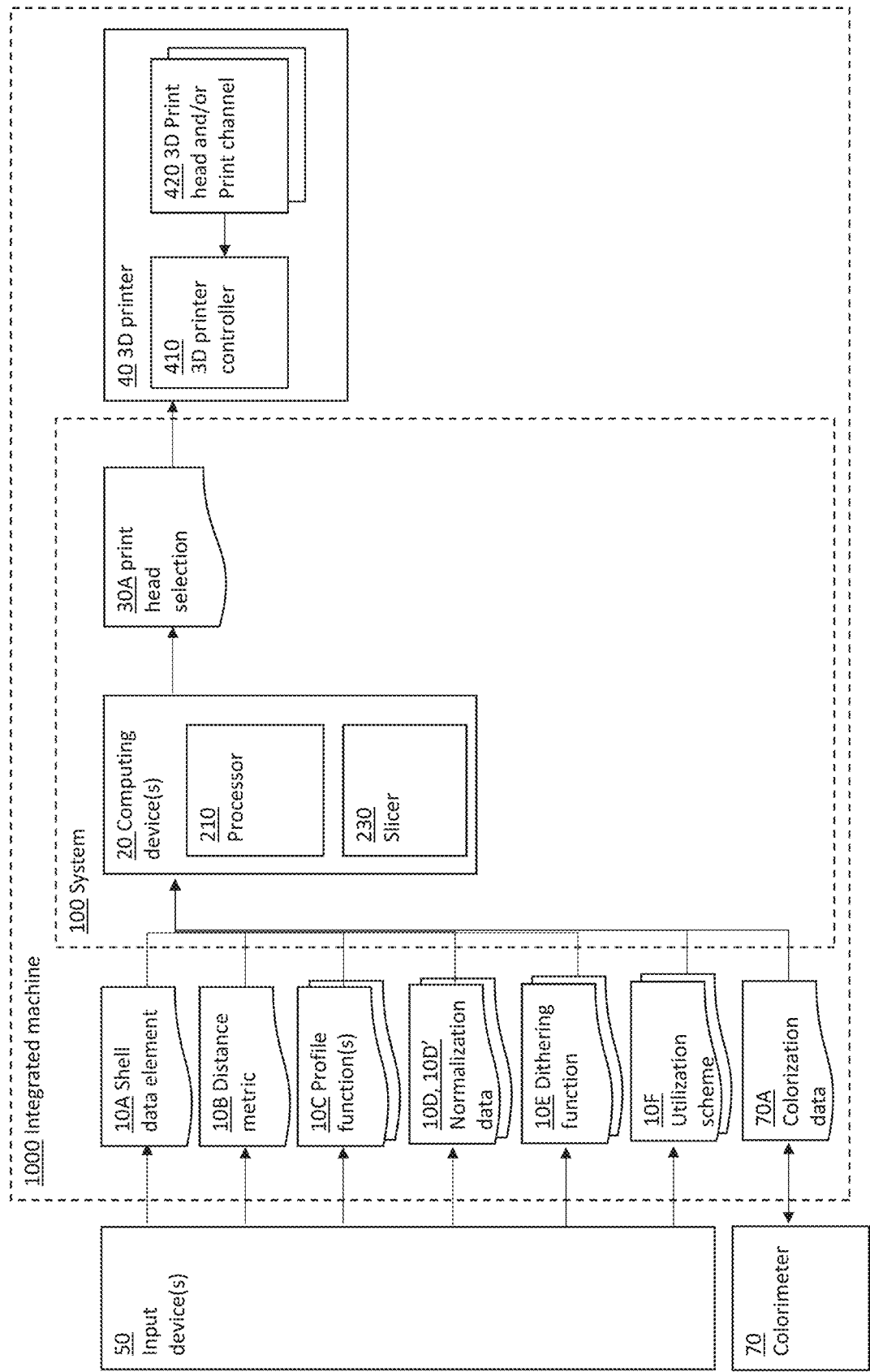
FIG. 2 is a simplified block diagram, depicting a system for selecting a print head of a 3D printing machine, according to some embodiments of the invention.

Reference is now made to FIG. 2, which is a simplified block diagram, depicting a system 100 for selecting a print head of a 3D printing machine, according to some embodiments. More detailed embodiments of system 100 are elaborated further below.

System 100 may include one or more computing elements or devices 20 (e.g., such as element 1 of FIG. 1), having one or more processors 210 (e.g., such as element 2 of FIG. 1). The one or more processors 210 may be adapted to control and/or execute one or more hardware and/or software modules, for producing a selection 30A of a print head 420 of a 3D printing machine 40.

Additionally, or alternatively, embodiments of the invention may include an integrated machine 1000, that may include an integration or combination of a 3D printer or printing machine 40 (e.g., including one or more print heads or printing channels 420) and a system 100 for selecting a print head of the one or more print heads, as elaborated herein. The term integration may be used in this context to indicate that components of integrated machine 1000 (e.g., system 100 and 3D printer 40) may collaborate so as to automatically select one or more print heads and print one or more 3D objects according to said selection, as elaborated herein.

As known in the art, print head 420 may be or may include a hardware component that may be adapted to dispense a specific 3D printing material (e.g., 3D printing ink) at a determined quantity and location of a printing grid of 3D printing machine 40. For example, print head 420 may include a dispenser of a printing material of specific color (e.g., cyan), and may be controlled for example by a driver or controller 410 of 3D printer 40 to dispense the printing material in a specific location in a printing grid.

Selection 30A may be or may include a data element or structure that may associate at least one point in the 3D printer's grid with a selection of a specific print head 420. For example, selection 30A may be or may include one or more entries in a table, that may associate geometric indices, such as X and Y coordinates of a printing grid and a Z coordinate (e.g., which may normally translate to an index of a slice of a 3D printed model), with a selection of a printing head. An example for such a table is brought herein in table 1:

TABLE 1

| Point | X | Y | Z | C | M | Y | K | W | T |
|---|---|---|---|---|---|---|---|---|---|
| P1 | X1 | Y1 | Slice 1 | 1 | 0 | 0 | 0 | 0 | 0 |
| P2 | X2 | Y2 | Slice 2 | 0 | 1 | 0 | 0 | 0 | 0 |
| P3 | X3 | Y3 | Slice 3 | 0 | 0 | 0 | 1 | 0 | 0 |

In the example of Table 1: Each entry relates to a specific printing point (e.g., P1, P2, P3); X represents the X coordinates on the printing grid of 3D printer 40 (e.g., X1, X2, X3); Y represents the Y coordinates on the printing grid of 3D printer 40 (e.g., Y1, Y2, Y3); Z represents the slice index (e.g., slice 1, slice 2, slice 3); C, M, Y, K, W and T respectively represent printing heads that dispense Cyan, Magenta, Yellow, Black, White and Transparent printing material.

In this example: a cyan point may be dispensed at coordinates (X1, Y1) of slice 1; a magenta point may be dispensed at coordinates (X2, Y2) of slice 2; and a black point may be dispensed at coordinates (X3, Y3) of slice 3.

As known in the art, the term 3D printing head may refer to a hardware component that may dispense 3D printing material at a predefined position. Implementations of commercially available 3D printing heads may include a single channel (e.g., hold a single type or color of printing material) or a multiple channel (e.g., hold one or more types or colors of printing materials). For the purpose of clarity, in the context of this document, the term 3D printing head may refer to a single channel of a dispenser of a printing material or color. It may be appreciated by a person skilled in the art that adaptations may be made so as to relate to printing heads having multiple channels as well.

As shown in FIG. 2, system 100 may be communicatively connected. e.g., via a communication network such as the internet with 3D printer 40. System 100 may produce a print head selection 30A and communicate selection 30A to 3D printer 40 via the communication network. Controller or driver 410 may control one or more hardware elements of 3D printer 40 such as the one or more print heads 420 so as to print a 3D object according to the data included in selection 30A.

Alternatively, system 100 may be included within 3D printer 40. For example, the one or more processors 210 of system 100 may be or may include the same entity as controller 410 and may communicate with hardware elements of 3D printer 40 such as print head 420 to produce a 3D printed object.

As shown in FIG. 2, system 100 may receive one or more input data elements 10, including for example: a shell data element 10A; a distance metric 10B; one or more profile functions 10C; one or more normalization functions 10D; and one or more dithering functions 10E.

According to some embodiments, system 100 may receive one or more input data elements 10 from one or more external devices 50 (e.g., such as computing device 1 of FIG. 1). Alternatively, or additionally, system 100 may receive the one or more input data elements 10 via an input device such as element 7 of FIG. 1 (e.g., from a user).

Shell data element 10A may describe or represent a 3D model for printing. The received data element may include a shell data element, corresponding to a 3D geometric shape of an object or defining an exterior of a 3D object. Shell 10A may be or may include a water-tight 3D polygonal mesh (e.g., a triangular mesh), where each polygon of the polygonal mesh may include or may be defined by one or more geometrical elements.

Figure 5:
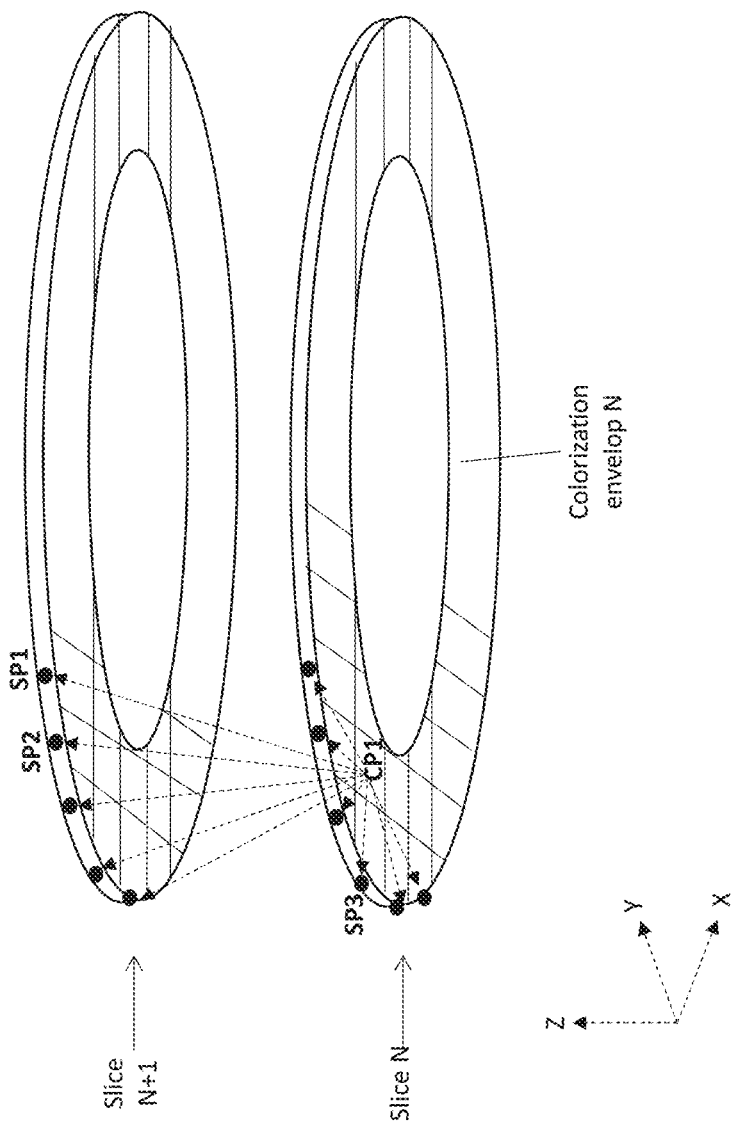
FIG. 5 is a schematic illustration of slices of a 3D object, according to some embodiments of the invention.

Distance metric input data element 10B is discussed further hereinunder (e.g., in relation to FIG. 5). Profile function data element 10C is discussed further hereinunder (e.g., in relation to FIG. 2). Normalization function(s) data elements 10D and dithering function(s) 10E are discussed further hereinunder (e.g., in relation to FIG. 6 and/or FIG. 9).

Figure 3:
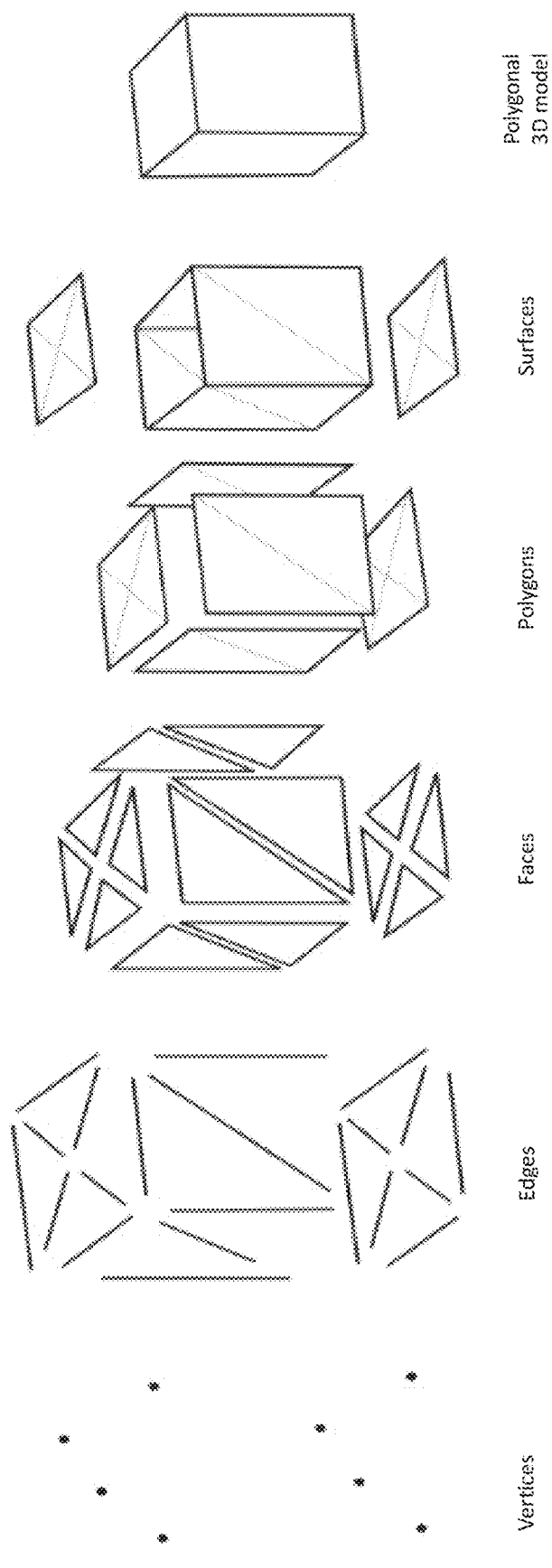
FIG. 3 is a schematic drawing, showing types of geometric elements including one or more shell points, according to some embodiments of the invention.

Reference is now made to FIG. 3, which is a schematic drawing, showing different types of shell points, according to some embodiments of the invention. In the example of FIG. 3, the shell is of a water-tight polygonal mesh defining a rectangular cube (cuboid). The cube may be defined by one or more geometrical elements such as vertices, edges, surfaces, and/or faces, etc. as depicted in the example of FIG. 3.

These one or more geometrical elements may herein be referred to as shell points or as a combination of shell points. For example, in an embodiment where a shell is defined by a plurality of vertices in a polygonal mesh, each such vertex may be referred herein as a shell point.

Shell data element 10A may comprise a plurality of shell points and a respective plurality of source colorization vectors. For example, one or more (e.g., each) shell point of the data element may be associated with a colorization vector such as a probabilistic red, green and blue (RGB) vector. The term probabilistic may be used herein to indicate that each element of the RGB vector (e.g., the red, green and blue elements) may be associated with a respective probability to appear in the respective position.

For example, to assign a brown color to a specific region of a shell of a 3D model, a probabilistic RGB colorization vector associated with one or more shell points in that region may have a value of (R=50%, G=50%, B=%). This value may indicate that the respective shell points may be assigned a red color and a green color in an equal probability. The region may thus be perceived (e.g., by a human viewer) as brown.

As known in the at, elements of probabilistic colorization vectors (e.g., R. G and B of probabilistic RGB colorization vectors) may or may not accumulate to 100%. For example, R, G and B elements may accumulate to a value that may be lower than 100% (e.g., 80%), resulting in a represented color that may have reduced color saturation, in relation to an RGB colorization vector of a similar hue (e.g., similar ratio between R, G and B elements) that accumulates to 100%.

Additionally. or alternatively, shell points (e.g., vertices) of the received shell data element 10A may be associated with a 2D image by a process commonly referred to in the art as UV mapping, by which each shell point of the data element may be assigned a colorization vector or texture that may be based on a color of a respective position in the 2D image. For example, a 2D map of the world may be mapped by UV mapping to a spherical 3D model to form a globe, where each shell point of the globe is assigned a respective color of the 2D map (e.g., blue for the ocean, brown for continents, etc.).

Currently available systems of 3D printing may utilize the information of the probabilistic RGB vector associated with shell points of the 3D model, to select a 3D printing head and apply 3D printing material at respective positions in the printed object. However, currently available systems of 3D printing may not take into consideration elements of the printed 3D model and/or elements of the 3D printing material selection process, as explained herein.

As known in the art of both 2D and 3D printing, colorization of 3D models may be presented on transmissive displays by a plurality of first colorization vectors, such as probabilistic RGB vectors. For example, light emitting diode (LED) display screens may emit light in red, green and blue colors and may be perceived by a viewer as a mixture of the emitted colors. The plurality of first colorization vectors (e.g., the probabilistic RGB vectors) may herein be referred to as source colorization vectors.

In contrast to colorization of transmissive displays, in order to perceive the same colors from a reflective object (e.g., from light reflected from a 3D printed object), a transformation from the plurality of source colorization vectors (e.g., the probabilistic RGB vectors) to a respective plurality of second colorization vectors (e.g., probabilistic CMYK vectors) must be performed. The plurality of second colorization vectors (e.g., the probabilistic CMYK vectors) may herein be referred to as target colorization vectors.

Referring back to FIG. 2, the one or more profile functions 10C may be or may include an association of a combination of one or more elements of a source colorization vector with a respective combination of one or more elements of a target colorization vector.

According to some embodiments, profile function 10C may be implemented as, or may include a formula for translating a combination of R, G and B elements of a probabilistic RGB colorization vector to C, M, Y and K elements of a probabilistic CMYK colorization vector. For example, as known in the art, C, M. Y and K elements may be calculated according to the following equations, Eq. 1 A through Eq. 1D:

$$K = 1 - \max(R, G, B); \quad \text{Eq. 1A:}$$

$$C = (1 - R - K)/(1 - K); \quad \text{Eq. 1B:}$$

$$M = (1 - G - K)/(1 - K); \text{ and} \quad \text{Eq. 1C:}$$

$$Y = (1 - B - K)/(1 - K). \quad \text{Eq. 1D:}$$

Additionally, or alternatively, the above formulation(s) may be altered, to accommodate specific characteristics of specific printing materials installed at 3D printer 40, such as clarity, opacity or hue of one or more printing materials. For example, Eq. 1A through Eq. 1D may be modified to include weighing factors (e.g., $W_k$, $W_c$, $W_m$ and $W_y$) that may compensate for such specific characteristics of printing materials. Accordingly, equations Eq. 1A through Eq. 1D may be modified, and written as equations Eq. 2A through Eq. 2D as follows:

$$K = W_k(1 - \max(R', G', B')); \quad \text{Eq. 2A:}$$

$$C = W_c((1 - R' - K)/(1 - K)); \quad \text{Eq. 2B:}$$

$$M = W_m((1 - G' - K)/(1 - K)); \text{ and} \quad \text{Eq. 2C:}$$

$$Y = W_y((1 - B' - K)/(1 - K)). \quad \text{Eq. 2D:}$$

Additionally, or alternatively, the one or more profile functions 10C may be implemented as, or may include a data structure, such as a table, that may associate a combination of one or more elements of a source colorization vector with a respective combination of one or more elements of a target colorization vector. An example for such a data structure is provided in the following Table 2A.

TABLE 2A

| Source colorization vector (RGB) | | | Target colorization vector (CMYK) | | | |
|---|---|---|---|---|---|---|
| R | G | B | C | M | Y | K |
| 100% | 0% | 0% | 0% | 50% | 50% | 0% |
| 0% | 100% | 0% | 50% | 0% | 50% | 0% |
| 0% | 0% | 100% | 50% | 50% | 0% | 0% |

Additionally, or alternatively, the one or more profile functions 10C may include a first profile function 10C, and a second profile function 10C. The first profile function 10C may be adapted to translate between a first, source colorization vector (e.g., a probabilistic RGB vector, including R, G and B base colors) and a second colorization vector. For example first profile function 10C may translate between a first, source RGB colorization vector and a target CMYK colorization vector (e.g., a probabilistic colorization vector having C, M, Y and K base colors), as elaborated in the example of Table 2A and/or according to Eq. 1A-1D above. In another example, first profile function 10C may translate between a first, source RGB colorization vector and an intermediary colorization vector (e.g., element 261B of FIG. 6) as elaborated herein (e.g., in relation to FIG. 6 and/or FIG. 9). The second profile function 10C may be applied on each base color (e.g., C, M, Y and K) of the second colorization vector (e.g., the target CMYK vector, the intermediary colorization vector) to compensate for specific properties or characteristics of specific printing materials installed at the 3D printing machine 40, such as clarity, opacity or hue of one or more printing materials. For example, in a condition that a specific printing material (e.g., of a specific brand, manufacturer or type) of a specific base color (e.g., Y) is clearer than other respective printing materials (e.g., Y printing materials of other manufacturers), then second profile function 10C may be adapted to compensate for the excessive clarity by increasing the relative portion of the Y component in the second colorization vector.

According to some embodiments, the second profile function 10C may be determined experimentally, or during a training stage, in relation to one or more (e.g., all) printing materials installed in the 3D printing machine. In some embodiments, the training stage may include: performing a sample printing of at least one 3D object; receiving, form a colorimeter 70, at least one data element 70A may include information pertaining to colorization of the at least one printed 3D object; calculating (e.g., by processor 210) a value of a gamut of the at least one 3D object; and calculating a value of required compensation for one or more (e.g., each) base color (e.g., C, M, Y and K) of the printing machine 40, so as to obtain a required (e.g., a predefined) gamut value.

According to some embodiments, and as depicted in FIG. 2, colorimeter 70 may be external to system 100, and may be communicatively connected to processor 210. It may be appreciated that in an alternative embodiment, colorimeter 70 may be included (e.g., as a peripheral component) in system 100. For example, processor 210 may configure or instruct colorimeter 70 to perform at least one measurement of colorimetry pertaining to a printed object and colorimeter 70 may respond with respective colorization data 70A.

For example, implementation of a second profile function 10C as elaborated above may amend the formulation of a target colorization vector (e.g., as elaborated in Table 2A) and may alter or amend components of that formulation to accommodate specific characteristics of specific printing materials installed at 3D printer 40 (e.g., clarity, opacity hue, saturation, etc.) of one or more printing materials. For example. Table 2A may be altered to produce Table 2B, so as to accurately produce colorization of the printed 3D object, while taking into account such specific characteristics of specific printing materials.

TABLE 2B

| Source colorization vector (RGB) | | | Target colorization vector (CMYK) | | | |
|---|---|---|---|---|---|---|
| R | G | B | C | M | Y | K |
| 100% | 0% | 0% | 4% | 48% | 48% | 0% |
| 0% | 100% | 0% | 50% | 0% | 47% | 3% |
| 0% | 0% | 100% | 50% | 49% | 1% | 0% |

According to some embodiments, system 100 may include a slicer module 230, configured to produce from shell data element 10A a plurality of slice data elements. The plurality of slice elements may be or may include data structures corresponding to respective planar slices of the 3D geometric shape represented by shell data element 10A. Additionally or alternatively, each planar slice of the 3D geometric shape may be represented by a data structure that may include data pertaining to a plurality of points aligned in a printing grid of the 3D printing machine.

For example, slice data elements may be or may include a table, that may associate each printing point within the slice with one or more data elements such as: coordinates of the printing point (PP) within the printing grid; a target colorization vector; and an identification of the shell point (SP) that is closest to the printing point, as explained herein (e.g., in relation to FIG. 5).

An example for a data structure of a slice data elements is provided in the following Table 3:

TABLE 3

| Printing point | Coordinates within slice | Target colorization vector | | | | Closest SP | |
|---|---|---|---|---|---|---|---|
| PP1 | (X1, Y1) | C1 | Y1 | M1 | K1 | Slice a | (Xa, Ya) |
| PP2 | (X2, Y2) | C2 | Y2 | M2 | K2 | Slice b | (Xb, Yb) |

Reference is now made to FIG. 4A, which is a schematic drawing, depicting a slice element of a printed 3D object (e.g., the globe) as known in the art. Commercially available systems for 3D printing may produce one or more slice elements, corresponding to respective planar slices of the 3D geometric shape. In this example, a 3D object may be defined by coordinates of a 3D space (e.g., the X, Y and Z coordinates), and slice element 61 of the 3D object may reside in a plane (e.g., the X-Y plane, corresponding to a specific value of the Z coordinate) of the 3D space. Commercially available systems for 3D printing may apply 3D printing material in the slice element 61 according to the colorization of shell points of the 3D object, as depicted by downward arrows in FIG. 4A. For example, a first shell point or region may be translated by the commercially available 3D printer to region 61A of slice 61, and a second shell point or region may be translated by the commercially available 3D printer to region 61B of slice 61.

As 3D printing material may not be entirely opaque, a viewer looking at region 61B from a direction that is not perfectly perpendicular to the surface of slice 61 (e.g., as depicted by arrow L1), may be able to see light that may be reflected from region 61A and diffused through region 61B.

Colorization of region 61B from the perspective of L1 may thus be degraded, depending on the hue and opacity of colorization of regions 61A and 61B, and upon the relative location (e.g., one before the other along line of sight L1) of regions 61A and 61B. It may therefore be understood by a person skilled in the art that commercially available 3D printing systems may not take into consideration one or more elements (e.g., hue, opacity, saturation) of the printing material during the process of 3D printing.

Reference is now made to FIG. 4B, which is a schematic drawing, depicting an opaque, printed 3D object, according to some embodiments of the invention. The term 'opaque' may be used in this context to indicate a first type of 3D printing that may utilize printing materials to provide an object which is substantially or at least partially opaque, in contrast to a second, different type of 3D printing, that may utilize printing materials, e.g. at least one printing material that may be substantially clear or transparent, to provide an object which is substantially or at least partially transparent, as elaborated herein (e.g., in relation to FIG. 8).

As shown in FIG. 4B, embodiments of the invention may produce one or more slice elements 62, corresponding to respective planar slices of the 3D object. In this example, a 3D object may be defined by coordinates of a 3D space (e.g., the X, Y and Z coordinates), and slice element 62 of the 3D object may reside in a plane (e.g., the X-Y plane, corresponding to a specific value of the Z coordinate) of the 3D space.

Embodiments of the invention may define, for one or more slices (e.g., for slice 62) a colorization envelope 62A at the contour of the slice (e.g., slice 62). Colorization envelope 62A may include a plurality of colorization points (CP) aligned in a printing grid of the 3D printing machine (e.g., element 40 of FIG. 2).

The term 'envelope' may be used herein to indicate a region of 3D printing that may include or may follow a circumference or a shell of the printed 3D object, and may typically be substantially thinner than a width of a cross-section of the printed 3D object. For example, in a condition that a width of a cross-section of the printed 3D object may be in the order of several centimeters, a width of an envelope (e.g., a colorization envelope, a white envelope, etc., as elaborated herein) may be in the order of one or more millimeters (e.g., from 0.5 a millimeter to 5 millimeters). It may be appreciated by a person skilled in the art that embodiments of the invention may produce a 3D printed object by using a thin colorization envelope 62A, to avoid degradation of colorization, as elaborated herein (e.g., in relation to the effect of regions 61A and 61B of FIG. 4A).

Reference is now made to FIG. 5 which is a schematic illustration of slices of a 3D object, according to some embodiments of the invention;

According to some embodiments, for one or more (e.g., each) CPs of one or more (e.g., all) slices, system 100 may determine the closest shell point (SP) among a plurality of (e.g., all) shell points.

For example, as depicted in FIG. 5, embodiments of system 100 may relate to colorization point CP1, located within a colorization envelope (e.g., colorization envelope N) of a slice (e.g., slice N). Embodiments of system 100 may calculate a distance from colorization point CP1 to a plurality of shell points (e.g., SP1, SP2, SP3) that may be located at the rim or edge of one or more slices (e.g., slice N, N+1), and hence may be referred to as shell points. System 100 may then determine the identity (e.g., the coordinates and slice index) of the closest shell point for one or more (e.g., all) colorization points. System 100 may subsequently update the slice data structure to include the determined closest SPs for one or more (e.g., all) CPs, as elaborated in Table 3.

Additionally, system 10 may receive at least one definition of a predefined distance metric (e.g., element 10B of FIG. 2) and determine the closest shell point among according to predefined distance metric 10B.

Predefined distance metric may be for example: a Euclidean distance, a Manhattan distance, a Tchebychev distance, a Minkowski distance and any combination thereof.

Referring back to FIG. 4B, according to some embodiments, for one or more colorization points, system 100 may attributing a target colorization vector based on the determined closest shell point and the respective source colorization vector.

For example, as explained herein, each shell point may be associated with a source colorization vector (e.g., a probabilistic RGB vector). After determining the closest shell point for a specific colorization point in a colorization envelope 62A, system may apply profile function 10C on the source colorization vector of the closest SP, to produce a target colorization vector (e.g., a probabilistic CMYK vector), and attribute the produced target colorization vector to the specific colorization point.

As explained herein, (e.g., in relation to FIG. 2 and as demonstrated by Table 2B and equations Eq. 2A through Eq. 2D), embodiments of system 10 may attribute a target colorization vector to one or more CPs by: receiving a profile function that may pertain to one or more 3D printing material (e.g., 3D printing ink) or correspond to one or more characteristics (e.g., hue, opacity, etc.) of printing materials that may be installed in 3D printing machine 40; and using the profile function to convert the source colorization vector to the target colorization vector.

According to some embodiments, for one or more (e.g., all) colorization points of one or more (e.g., all) slices, system 100 may subsequently select a printing head and/or printing channel based on the attributed target colorization vector, as explained herein (e.g., in relation to FIG. 6 and/or FIG. 9).

Referring back to FIG. 4B, for one or more slices, embodiments of system 100 may define a white region or envelope 62B, adjacent colorization envelope 62A of the slice. White region or envelope 62B may include a plurality of white points that may be aligned in a printing grid of 3D printing machine 40. According to some embodiments, white region 62B may include a plurality of (e.g., all) slice 62 printing points that are defined or limited by the envelope of colorization points 62A. Alternatively, as depicted in FIG. 4B, region 62B may be an envelope of a predefined width and may define or limit an inner core region 62C. Alternatively, region 62B may be of a predefined width and be located between envelope of colorization points 62A and inner core region 62C.

It may be appreciated by a person skilled in the art that white printing material may normally be substantially opaquer and/or more reflective than printing materials of other colors. Embodiments of the present invention may utilize these characteristics to produce opaque 3D printed objects that may have improved color saturation, gamut and/or opacity in relation to state-of-the-art 3D printing systems, as explained herein.

As shown in FIG. 4B, a viewer who may be observing a region 62A' of the colorized points 62A from a direction marked by arrow L1, may not see light that may have been refracted by region 62A". Thus, in contrast to commercially available state-of-the-art 3D printing systems as explained in relation to FIG. 4A, the perceived colorization of region 62A' may not be degraded by the colorization of adjacent region 62A". Instead, the viewer may see light that may be reflected by white region 62B. It will be appreciated by a person skilled in the art that such reflection of light from white region or envelope 62B may also increase the saturation of color of region 62A' as perceived by the viewer, thus providing 3D printing system 40 an improved colorization gamut, using the same 3D printing material(s).

According to some embodiments of the invention, the width or thickness (e.g., measured in millimeters, pixels and/or printing points) of colorized envelope 62A and/or the width of white region or envelope 62B may be determined based on one or more properties or characteristics of one or more printing materials.

For example, assume that a first region (e.g., 62A') may be printed using one or more printing materials having a first opacity and a second region (e.g., 62A") may be printed using one or more printing materials having a second, higher opacity. In some embodiments, the width of colorized envelope 62A at the second region (e.g., 62A") may be less than or thinner than the width of colorized envelope 62A at the first region (e.g., 62A'), so as to require or consume less colorized printing material at the second region.

Pertaining to the same example, the width of the white envelope or region 62B at the location adjacent the second colorized region (e.g., 62A") may be less than or thinner than the width of the white region at the location adjacent the first colorized region (e.g., 62A').

Additionally, or alternatively, the width or thickness (e.g., measured in millimeters, pixels and/or printing points) of colorized envelope 62A and/or the width of white region or envelope 62B may be determined based on geometric properties of the 3D printed object.

For example, assume that a first 3D printed object or region has a first width and a second 3D printed object or region has a second width, substantially smaller than the first width, such that light may be transferred through the second width (so as to be visually perceived by a viewer). Thickness of colorized envelope 62A and thickness of white envelope or region 62B of the first, thick 3D object or region may be set to a maximal value so as to provide maximum color saturation and opacity. Thickness of colorized envelope 62A and thickness of white envelope or region 62B of the second, thin 3D object or region may be set so as to provide optimal color saturation and opacity.

According to some embodiments of the invention, at least one of the width of colorized envelope 62A and/or the width of white envelope region 62B may be determined according to specific printing materials or combinations thereof. For example, embodiments of the invention may include a minimal width table that may associate one or more printing materials or combinations thereof with a minimal width of colorized envelope 62A and/or a minimal width of white envelope region 62B, as elaborated in the example of Table 4 below:

TABLE 4

| Printing material | Minimal colorized envelope width | Minimal white envelope width |
|---|---|---|
| PM1 | WC1 | WW1 |
| PM2 | WC2 | WW2 |
| PM3 | WC3 | WW3 |
| PM4 | WC4 | WW4 |
| PM5 | WC5 | WW5 |

In the example of Table 4:

A first printing material (e.g., PM1, such as a Cyan printing material) may require a first minimal colorized envelope width (WC1, e.g., in millimeters) and a first minimal white envelope width (WW1, e.g., in millimeters);

A second printing material (e.g., PM2, such as a Magenta printing material) may require a second minimal colorized envelope width (WC2) and a second minimal white envelope width (WW2);

A third printing material (e.g., PM3, such as a Yellow printing material) may require a third minimal colorized envelope width (WC3) and a third minimal white envelope width (WW3);

A fourth printing material (e.g., PM4, such as a Black printing material) may require a fourth minimal colorized envelope width (WC4) and a fourth minimal white envelope width (WW4); and A fifth printing material (e.g., PM5, such as a White printing material) may require a fifth minimal colorized envelope width (WC5) and a fifth minimal white envelope width (WW5).

As elaborated herein, a colorization of a region in the colorization envelope may be expressed by a combination of a plurality of printing materials of different colors, for example by a probabilistic CMYKW vector (e.g., [C=30%; M=20%; Y=40%; K=0%, W=10%]). In such a condition, a minimal width of at least one of the colorized envelope and/or the white envelope or region may be calculated as a function of the one or more widths pertaining to the individual printing materials.

For example, a minimal width of a colorized envelope and/or white region may be set as the maximal width of the respective colorized envelope and/or white region of participating printing materials (e.g., max (WC1, WC2, WC3, WC5) and/or max (WW1, WW2, WW3, WW5) respectively).

In another example, a minimal width of a colorized envelope and/or white region may be set to be a weighted average of the respective components of the colorization (e.g., weighted according to [C=30%; M=20%; Y=40%; K=0%, W=10%]). Other metrics for determining at least one of a width of a colorized envelope and/or a width of a white region may also be used, as appreciated by persons skilled in the art.

As shown in FIG. 4B, slice 62 may include a core region 62C, including a plurality of printing points aligned to the printing grid of 3D printing machine 40. Core region 62C may not be visible to a viewer (e.g., observing the 3D object in the direction of L1), and may thus include printing material of any colorization.

According to some embodiments, core region 62C may include printing material from one or more printing heads 420 of 3D printer 40, selected so as to keep all printing heads of the 3D printer at work, to avoid clogging of the printer heads.

Additionally, or alternatively, core region 62C may include printing material from one or more printing heads 420 of 3D printer 40, selected so as to keep a balance of work load between printing heads 420 of 3D printer 40 or more efficiently make use of available materials that might otherwise be less or not required for a specific object. Such load balance may, for example allow concurrent printing of two or more printing heads (e.g., dispensing a first colored printing material at colorization envelope 62A, and a second colored printing material at core region 62C), so as to conserve printing time.

Additionally, or alternatively, core region 62C may include one or more areas that may be devoid of printing material, so as to conserve printing material and printing job time.

Figure 6:
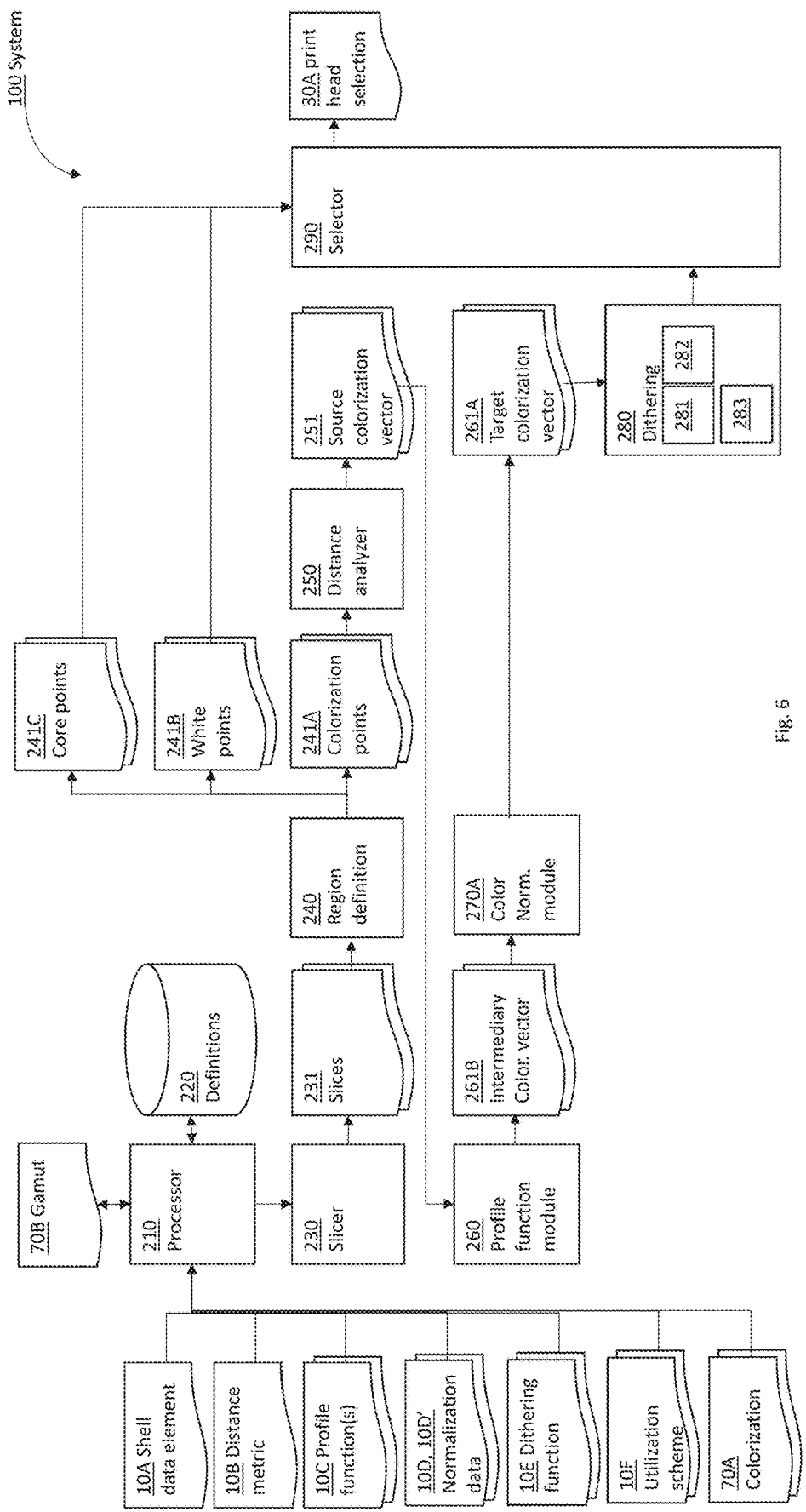
FIG. 6 is a block diagram, depicting a system for selecting a print head of a 3D printing machine, according to some embodiments of the invention.

Reference is now made to FIG. 6 which is a block diagram, depicting a system for selecting a print head and/or printing channel of a 3D printing machine, according to some embodiments of the invention. Arrows included in FIG. 6 may depict examples for communication of data from one module of system 100 to another. However, it may be appreciated that additional data routes may also be possible and have been omitted from FIG. 6 for the purpose of clarity.

As elaborated herein. System 100 may receive a shell data element 10A that may correspond to a 3D geometric shape of an object. The shell may include a plurality of shell points and a respective plurality of source colorization vectors (e.g., probabilistic RGB colorization vectors). System 100 may include a slicer or slicer module 230, configured to produce a plurality of slice elements 231, such as slice element 62 of FIG. 4B. Slice elements 231 may correspond to respective planar slices of the 3D geometric shape.

As shown in FIG. 6, system 100 may include a region definition module 240, adapted to define, per each slice 231, at least one of: (a) a colorization envelope (e.g., element 62A of FIG. 4B) including a plurality of colorization points 241A; (b) a white envelope or region (e.g., element 62B of FIG. 4B) including a plurality of white points 241B; and (c) a core region (e.g., element 62C of FIG. 4B) including a plurality of core points 241C.

As elaborated herein in relation to FIG. 4B, the width or thickness (e.g., measured in millimeters, pixels and/or printing points) of colorized envelope 62A and/or the width of white region or envelope 62B may be determined based on one or more properties or characteristics of one or more printing materials and/or geometry of the 3D object.

System 100 may include a distance analyzer module 250, configured to determine, for one or more colorization points 241A, the closest shell point among a plurality of (e.g., all) shell points, as elaborated herein (e.g., in relation to FIG. 5). As explained herein, system 100 may receive a definition for a distance metric (e.g., a Euclidean distance, a Manhattan distance, a Tchebychev distance, a Minkowski distance and any combination thereof).

Distance analyzer module 250 may subsequently perform one or more of: calculate the distance from at least one CP to one or more SPs by the predefined distance metric, as explained in relation to FIG. 5; determine the SP that may be closest to the at least one CP; obtain a source colorization vector 251 that may be attributed to the determined closest SP; and update or add an identification of the determined closest SP to the slice data element 231, as shown in the example of Table 3.

As explained herein, system 100 may obtain a plurality of source colorization vectors (e.g., probabilistic RGB vectors) that may be attributed to a respective plurality (e.g., all) colorization points.

For example, system 100 may include a profile function module 260, that may be configured to: receive at least one profile function 10; for one or more (e.g., each) CP, compute a target colorization vector 261A based on the source colorization vector 251 of the determined closest shell point and/or based on the received at least one profile function 10, as explained herein (e.g., in relation to FIG. 2); attribute the computed target colorization vector 261A to the one or more CPs; and update slice data element 231 to include the target colorization vector, as shown in the example of Table 3.

Alternatively, or additionally, as depicted in the example of FIG. 6, system 100 may obtain target colorization vector 261A in a plurality of stages. For example, profile function module 260 may receive a profile function 10C pertaining to one or more 3D printing materials (e.g., 3D printing inks) of 3D printing machine 40 and may use the received profile function to convert source colorization vector 251 (e.g., a probabilistic RGB colorization vector) to an intermediary colorization vector 261B (e.g., a probabilistic CMYK colorization vector).

As elaborated herein, system 100 may include a color normalization module 270A which may be configured to receive intermediary colorization vector 261B and produce therefrom a target colorization vector 261A (e.g., a probabilistic cyan, magenta, yellow, black and white (CMYKW) colorization vector). Additionally, or alternatively, as elaborated herein (e.g., in the context of FIG. 9) color normalization module 270A may be configured to receive intermediary colorization vector 261B and produce therefrom another intermediary colorization vector 261C, which may subsequently be further processed (e.g., by transparency normalization module 270B of FIG. 9) to produce target colorization vector 261A.

As known in the art, International Color Consortium (ICC) color profiles (e.g., for a CMYK color space) may enable representation of color in a probabilistic colorization vector, in which every component may range between 0% and 100%. For example, in a condition in which a CMYK probabilistic colorization vector is used for 2D printing (e.g., on white paper), each component of the vector may be applied to each point of the printed surface, at a range of between 0% and 100%, thus amounting to a maximal value of 400% for all components. It may be appreciated that such representation of a probabilistic colorization vector, where the maximal value of the sum of components exceeds 100% may not be feasible in a 3D printing environment, as each volumetric element in the 3D model may represent not only a color, but also a spatial location or dimension.

As known in the art, a specific combination of elements in a colorization vector (e.g., a CMYK vector) may be used by a 2D or 3D printing machines to produce a colored point of a specific, selected hue. In theory, changing values of elements in the colorization vector (e.g., the C, M, Y and K elements) while maintaining a ratio between the components should substantially preserve the specific hue and should change the color saturation of the colored point. For example, a first colorization vector such as [C=50%; M=50%; Y=50%; K=0%] may produce a first colored point having a brown hue of a first level of color saturation and a second colorization vector such as [C=25%; M=25%; Y=25%; K=0%] may produce a second colored point having the same brown hue and a second level of color saturation that may be lower than the first level of color saturation (e.g., appear fainter than the first colored point). However, experiments show that maintaining the same ratio of values of colorization vector elements (as in the above example) does not necessarily result in maintaining the hue of the colored points as perceived by a viewer. In other words, a normalization function must be used in order to maintain the same hue that is desired to be perceived by the viewer.

Accordingly, color normalization module 270A may (a) receive a color normalization function or configuration data element 10D, pertaining to one or more 3D printing materials (e.g., 3D printing inks) of the 3D printing machine; and (b) use the color normalization data element to normalize one or more components of intermediary colorization vector 261B, and thus convert or translate intermediary colorization vector 261B to target colorization vector 261A.

For example: (a) source colorization vector 251 may be a probabilistic RGB vector; (b) intermediary colorization vector 261B may be a probabilistic CMYK vector as elaborated herein; and (c) color normalization or configuration data element 10D may include a ratio compensation function that may be predefined (e.g., by a user, via input device 7 of FIG. 1, according to properties of the one or more printing materials) to change a ratio between components of the colorization vector so as to maintain the hue. At a first stage, color normalization module 270A may be configured to complement the values of intermediary colorization vector 261B components to 100%. Pertaining to the example of the brown color, the resulting probabilistic colorization vector may be: [C=33.3%; M=33.3%; Y=33.3%; K=0%]. At a second stage, color normalization module 270A may be configured to apply color normalization data element 10D so as to compensate or amend values of components of the resulting probabilistic colorization vector (e.g., to be: [C=35%; M=32%; Y=33.3%; K=0%]) so as to maintain the desired hue.

It may, however, be appreciated that such linear translation of a colorization vector so as to achieve a 100% representation may result in loss of color space. For example, a first CMYK probabilistic colorization vector may be [C=30%, M=30%, Y=0%, K=0%] and may represent (e.g., when printed on paper) a light purple color. A second CMYK probabilistic colorization vector may be [C=80%, M=80%, Y=0%, K=0%] and may also represent (e.g., when printed on paper) a purple color of the same hue as that of the first CMYK vector, but of higher saturation (e.g., darker). A mere linear translation of the two vectors so as to complement 100% may result in the same colorization vector: [C=50%, M=50%, Y=0%, K=0%], thus losing a portion of the color space (e.g., losing representation of color saturation).

Figure 9:
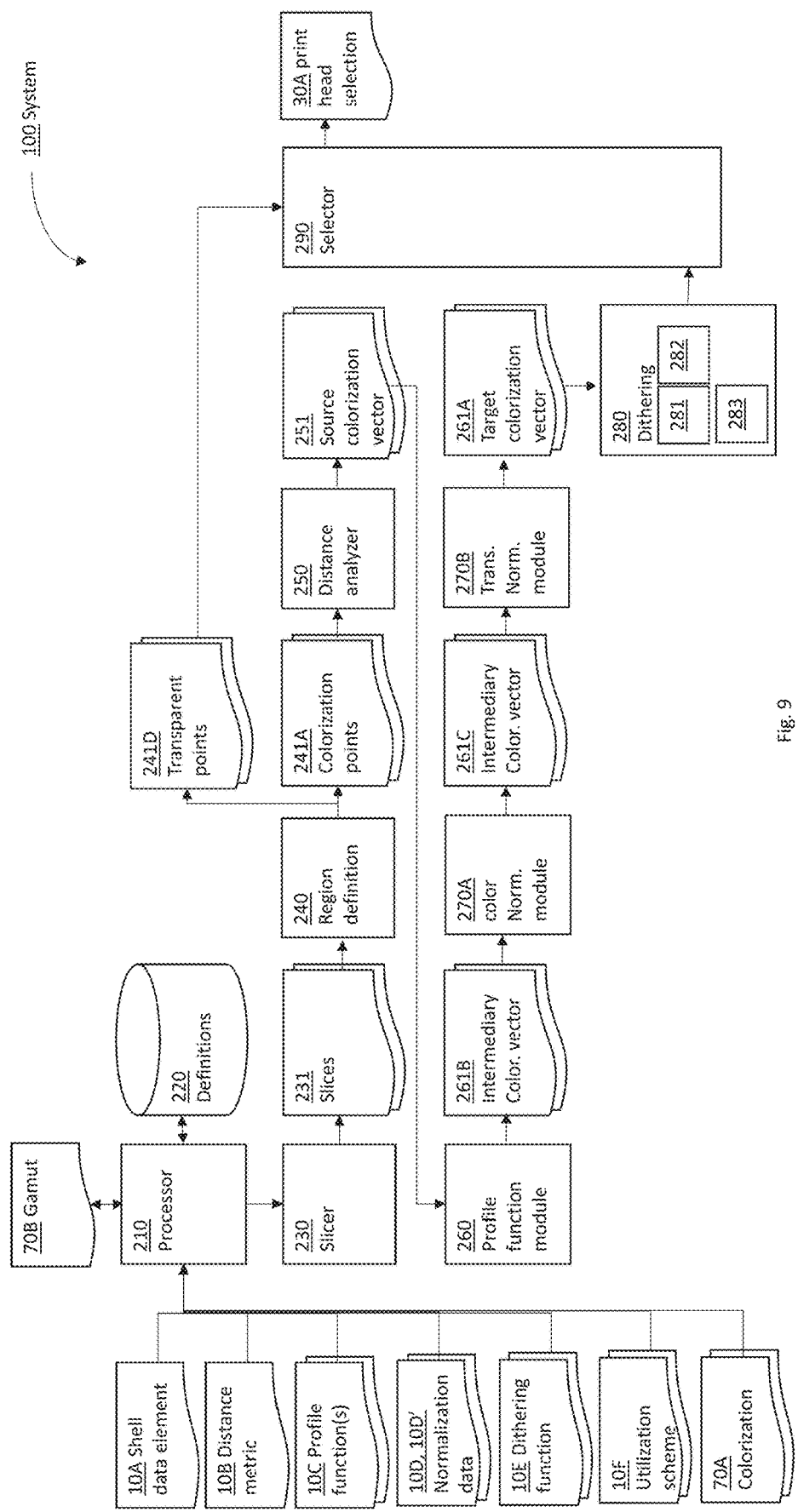
FIG. 9 is a block diagram, depicting a system for selecting a print head of a 3D printing machine, according to some embodiments of the invention.

Embodiments of the invention may provide a practical application for translating or normalizing one or more components of a probabilistic colorization vector (e.g., intermediary colorization vector 261B), to produce a target colorization vector 261A (or another intermediary colorization vector 261C, as elaborated herein in the context of FIG. 9) without losing a portion of the represented color space.

In some embodiments, color normalization module 270A may receive a color normalization configuration data element 10D, and may add white printing material to intermediary colorization vector 261B according to the color normalization configuration data element 10D. For example, color normalization module 270A may complement the values of intermediary colorization vector 261B components to 100% by adding a component of white printing material (W) and thus translating intermediary CMYK colorization vector 261B to a probabilistic cyan, magenta, yellow, black and white (CMYKW) target colorization vector.

In one example of a color normalization configuration 10D, in order to convertor translate intermediary colorization vector 261B (e.g., probabilistic CMYK vector) to target colorization vector 261A (e.g., probabilistic CMYKW vector), color normalization module 270A may downscale the CMYK components of the intermediary colorization vector 261B, so as to "make room" for the white (W) component, as elaborated herein.

In another example of a color normalization configuration 10D, color normalization module 270A may convert or translate intermediary colorization vector 261B (e.g., probabilistic CMYK vector) to target colorization vector 261A (e.g., probabilistic CMYKW vector) by: (a) if a sum of probabilistic components C, M, Y and K of the CMYK intermediary colorization vector 261B is below 100 percent (e.g., [C=30%; M=30%; Y=30%; K=0%]) then color normalization module 270A may assign a 100 percent complement value to the W component of the CMYKW target colorization vector 261A (e.g., [C=30%; M=30%; Y=30%; K=0%, W=10%]); and (b) if a sum of probabilistic components C, M, Y and K of the CMYK intermediary colorization vector 261B exceeds 100 percent (e.g., [C=40%; M=40%; Y=40%; K=0%]) then color normalization module 270A may downscale each component of the CMYK vector according to the one or more color normalization data elements, so that values of C, M, Y and K components of the CMYKW target vector may complement to 100 percent. For example, color normalization module 270A may downscale each component of the CMYK vector while maintaining the same ratio among elements of intermediary colorization vector 261B so as to complement to 100 percent (e.g., [C=33.3%; M=33.3%; Y=33.3%; K=0%, W=0%]).

In another example of a color normalization configuration 10D, color normalization module 270A may convert or translate intermediary colorization vector 261B (e.g., probabilistic CMYK vector) to target colorization vector 261A (e.g., probabilistic CMYKW vector) by: (a) for each base color component (e.g., C, M, Y and K) of intermediary colorization vector 261B, multiplying the probability component with the respective proportion of the overall sum; and (b) complementing the result with a white component, up to 100%.

In other words, color normalization module 270A may: (a) calculate a first sum of probability components of intermediary colorization vector 261B; (b) for each base color component (e.g., C, M, Y and K) of intermediary colorization vector 261A, multiply the respective probability component with the proportion of that base color from the first sum; (c) calculate a second sum of the products of said multiplications; and (d) complement the second sum with a white component, up to 100%, so as to produce a second colorization vector (e.g., a probabilistic, CMYKW target colorization vector 261A, as elaborated herein, in relation to FIG. 6 and/or a probabilistic, CMYKW second intermediary colorization vector 261C, as elaborated herein, in relation to FIG. 9).

For example, a first intermediary colorization vector 261B may be [C=30%, M=30%, Y=0%, K=0%], representing a light purple hue, and a second intermediary colorization vector 261B may be [C=80%, M=80%, Y=0%, K=0%], representing a saturated or dark purple color, of the same hue. Taking the first vector as an example, the sum for all components of the vector is 60%. Hence each of components C (30%) and M (30%) comprise 50% of the overall sum (60%). Color normalization module 270A may multiply the probability component with the respective proportion of the overall sum for all components of each of the above vectors. This may produce a first result of [15%, 15%, 0%, 0%], corresponding to the first intermediary colorization vector 261B, and second result of [40%, 40%, 0%, 0%], corresponding to the first intermediary colorization vector 261B. Color normalization module 270A may then complement the resulting vectors with a white component up to 100%, to produce a probabilistic, CMYKW target colorization vector 261A (or another intermediary colorization vector 261C, as elaborated herein in the context of FIG. 9). In this example, a first probabilistic, CMYKW target colorization vector 261A, corresponding to the first intermediary colorization vector 261B may be [C=15%, M=15%. Y=0%, K=0%, W=70%] (15+15+0+0+70=100), and a second probabilistic. CMYKW target colorization vector 261A, corresponding to the second intermediary colorization vector 261B may be [C=40%, M=40%. Y=0%, K=0%, W=20%] (40+40+0+0+20=100). It may be noted here that the second target colorization vector 261A may represent a purple color that may be more saturated than the purple color of the first target colorization vector 261A. Hence, no portion of the color space has been lost during the translation of intermediary colorization vector 261B to target colorization vector 261A.

In yet another example of a color normalization configuration 10D, color normalization module 270A may normalize one or more components of intermediary colorization vector 261B (e.g., a probabilistic CMYK colorization vector) so as to convert or translate intermediary colorization vector 261B to target colorization vector 261A (e.g., a probabilistic CMYKW vector) or to another intermediary colorization vector (e.g., element 261C as elaborated herein in relation to FIG. 9) by: (a) for each base color component (e.g., C, M, Y and K) of intermediary colorization vector 261B, color normalization module 270A may calculate the complement of the relevant probability component to 100%; (b) multiply the calculated complement values of one or more (e.g., all) base colors to obtain a probability of a W (white) component; (c) calculate a sum of probability values of base color components of the intermediary colorization vector 261B; and (d) linearly normalize the values of base color components (e.g., C, M, Y and K), based on the sum of components, so as to complement to 100% with the W (white) component.

The term "linear normalization" may be used in this context to indicate a linear operation such as a multiplication of all base color probability components by a specific correction value, such that the sum of all probability components of all base colors (e.g., C, M. Y and K) would complement the calculated probability component of the W color to 100%.

Pertaining to the same example of a first intermediary colorization vector 261B ([C=30%, M=30%. Y=0%. K=0%]), representing a light purple hue, and a second intermediary colorization vector 261B ([C=80%. M=80%, Y=0%. K=0%]) representing a saturated purple color of the same hue, color normalization module 270A may calculate each component's complement to 100%. In this example, the calculated complement values of the first intermediary colorization vector 261B may be ([C=70%, M=70%, Y=100%, K=100%]) and the calculated complement values of the second intermediary colorization vector 261B may be ([C=20%, M=20%, Y=100%, K=100%]). Color normalization module 270A may multiply the complement values, to obtain a probability of a W (white) component. In this example, the value of the W component corresponding to the first intermediary colorization vector 261B may be 0.7*0.7*1*1=0.49, and the value of the W component corresponding to the second intermediary colorization vector 261B may be 0.2*0.2*1*1=0.04.

Color normalization module 270A may calculate the complement of the W component. In this example, the complement of the W component corresponding to the first intermediary colorization vector 261B may be 0.51=(1−0.49) and the complement of the W component corresponding to the second intermediary colorization vector 261B may be 0.96=(1−0.04).

Color normalization module 270A may calculate a sum of probability values of base color components of the intermediary colorization vector 261B. In this example, the sum of base color components of the first intermediary colorization vector 261B may be 30%+30%+0%+0%=60%, and the sum of base color components of the second intermediary colorization vector 261B may be 80%+80%+0%+0%=160%.

Color normalization module 270A may linearly normalize the base color component values (e.g., C, M, Y and K) of the intermediary colorization vector 261B based on the calculated sum of probability values, according to the 100% complement of the W component. In this example, the C, M, Y and K values corresponding to the first intermediary colorization vector 261B may be [C=(0.51*30/0.6)%, M=(0.51*30/0.6)%, Y=(0.51*0/0.6)%, K=(0.51*0/0.6)%]=[C=25.5%, M=25.5%, Y=0%, K=0%] and the C, M, Y and K values corresponding to the second intermediary colorization vector 261B may be [C=(0.96*80/1.6)%, M=(0.96*80/1.6)%, Y=(0.96*0/1.6)%, K=(0.96*0/1.6)%]=[C=48%, M=48%, Y=0%, K=0%].

Color normalization module 270A may thus produce a CMYKW probabilistic target colorization vector 261A, that may correspond to a respective intermediary colorization vectors 261B and that may include components that complement to 100%.

In this example, a first probabilistic, CMYKW target colorization vector 261A, corresponding to the first intermediary colorization vector 261B may be [C=25.5%, M=25.5%, Y=0%, K=0%, W=49%] (25.5+25.5+0+0+49=100), and a second probabilistic. CMYKW target colorization vector 261A, corresponding to the second intermediary colorization vector 261B may be [C=48%, M=48%, Y=0%, K=0%, W=4%] (48+48+0+0+4=100). As in the previous example, it may be noted here that the second target colorization vector 261A may represent a purple color that may be more saturated than the purple color of the first target colorization vector 261A. Hence, as in the previous example, no portion of the color space has been lost during the translation of intermediary colorization vector 261B to target colorization vector 261A.

In view of the examples brought above, it may be appreciated that color normalization module 270A may thus translate the received intermediary colorization vectors 261B to a target colorization vector 261A (or to another intermediary colorization vectors 261C, as elaborated herein in relation to FIG. 9), and that the outcome vector (e.g., target colorization vector 261A) may: (a) be defined by components that accumulate to 100%, and thus facilitate the spatial definition required from a 3D printing device (e.g., in contrast to a 2D paper printing device), as explained above; (b) maintain a ratio among components of intermediary colorization vector 261B, so as to substantially enabling system 100 to maintain the same desired hue; (c) optionally include amendment to components of intermediary colorization vector 261B, so as to compensate for changes in colorization that may be caused by non-linear properties (e.g., transparency) of specific printing materials; and (d) maintain the color space that may be defined or represented by intermediary colorization vector 261B.

System 100 may include a dithering module 280 configured to receive one or more dithering functions or algorithms 10E and apply the one or more dithering functions or algorithms 10E on one or more target colorization vectors 261A, to obtain therefrom a value 281 of a droplet of color. For example, in an embodiment where target colorization vector 261A is a probabilistic CMYKW colorization vector, the obtained droplet color value 281 may be, for example: cyan, magenta, yellow, black and white.

Dithering module 280 may receive data pertaining to a slice data element 231 (e.g., as elaborated in the example of Table 3), including a plurality of colorization points 241A and a respective plurality of target colorization vectors 261A. Dithering module 280 may apply one or more dithering algorithms on the values of target colorization vectors 261A of slice data element 231, so as to produce a droplet color value 281 for one or more (e.g., all) colorization points included in slice data element 231.

According to some embodiments, the dithering algorithm or function 10E may include, for example one or more dithering algorithms, including for example: a maximal value selection dithering algorithm, a threshold dithering algorithm, a random dithering algorithm, a patterning dithering algorithm, an ordered dithering algorithm (e.g. halftone dithering. Bayer dithering, Blue noise dithering as known in the art), an error diffusion dithering algorithm (e.g. Floyd-Steinberg dithering, Jarvis dithering, Stucki dithering. Burks dithering, Sierra dithering. Atkinson dithering, Gradient-based error diffusion dithering as known in the art), a depth selection dithering algorithm, and any combination thereof.

For example, in a condition that a dithering algorithm or function 10E is a maximal value selection, dithering module 280 may produce a droplet color value 281 that may correspond to a maximal component of attributed target colorization vector 261A. For example, if components of a target colorization vector 261A attributed to a specific colorization point 241A are [C=10%; M=20%; Y=0%; K=34%; W=36%] then the produced droplet color value 281 may be W (white).

In another example, dithering algorithm or function 10E may be a Blue noise dithering algorithm. Dithering module 280 may consequently add noise (e.g., "blue noise", as commonly referred to in the art) to components of the attributed target colorization vector 261A. Pertaining to the same example, attributed target colorization vector 261A [C=10%; M=20%; Y=0%; K=34%; W=36%] may be changed due to the added noise and may become [C=9%; M=21%; Y=1%; K=35%; W=34%]. Dithering module 280 may thus produce a droplet color value 281 that is K (black).

In another example, dithering algorithm or function 10E may be an error diffusion dithering algorithm, as known in the art. In this condition, to determine or produce a droplet color value 281, dithering module 280 may relate to neighboring or previous selections. For example, if components of a first target colorization vector 261A, attributed to a first specific colorization point 241A are [C=10%; M=20%; Y=0%; K=34%; W=36%], then dithering module 280 may produce or select a respective droplet color value 281 that is W (white), as explained in the example of maximal value selection. If components of a second target colorization vector 261A, attributed to a second, adjacent colorization point 241A are also [C=10%; M=20%; Y=0%; K=34%; W=36%], dithering module 280 may take the first selection into consideration, decrease a probability value of a previously selected component (e.g., white) and thus produce for the second, adjacent colorization point 241A a droplet color value 281 that is K (black).

Figure 7:
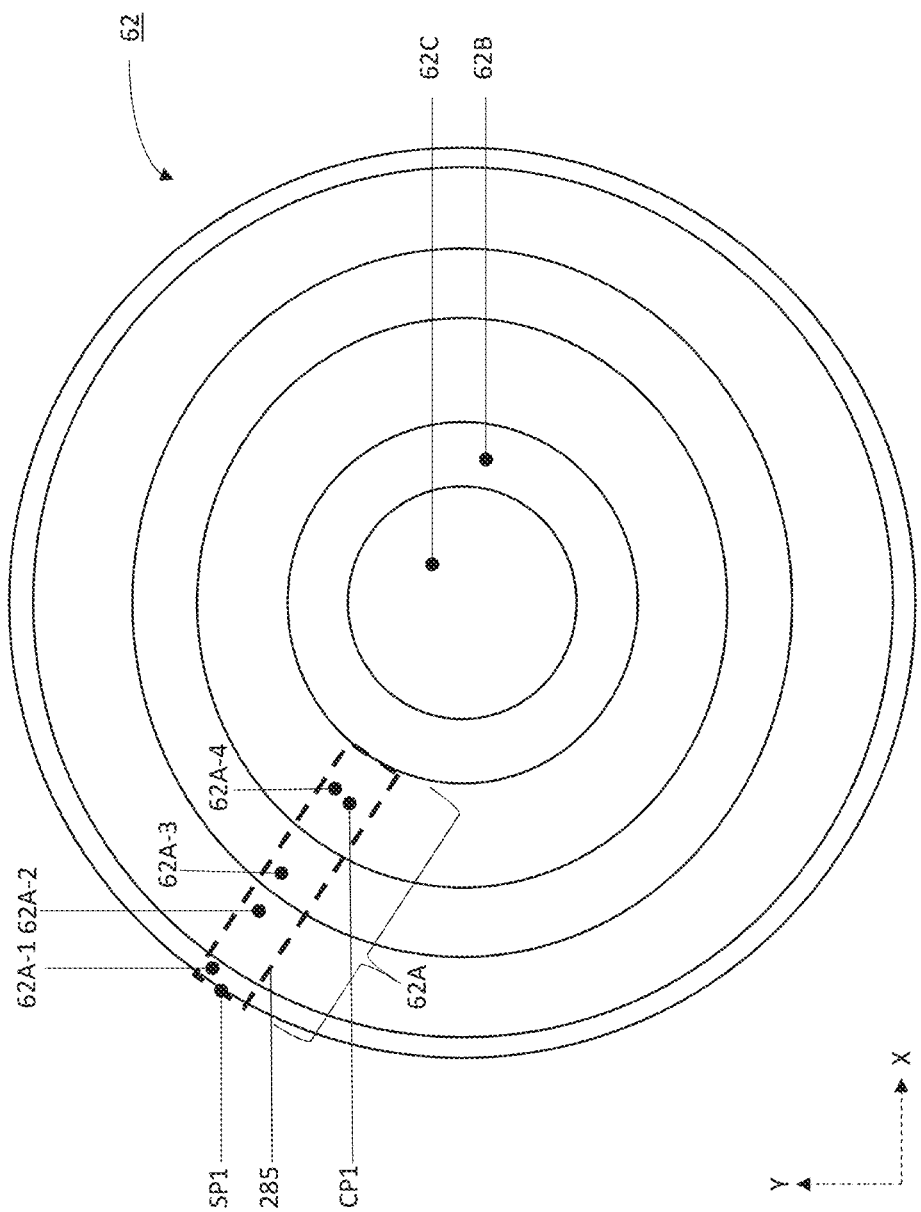
FIG. 7 is a schematic illustration depicting implementation of a depth selection dithering algorithm, according to some embodiments.

Reference is now made to FIG. 7 which is a schematic illustration depicting implementation of a depth selection dithering algorithm, according to some embodiments.

As elaborated herein (e.g., in relation to FIG. 5), for one or more (e.g., each) colorization points (e.g., CP) of one or more (e.g., all) slices, system 100 may determine the closest shell point (e.g., SP1) among a plurality of (e.g., all) shell points. Embodiments may subsequently attribute a target colorization vector 261A to the one or more colorization points (e.g., CP1) based on source colorization vector 251 of the closest shell point (e.g., SP1), as elaborated herein (e.g., in relation to FIG. 6).

In a condition in which dithering algorithm or function 10E may be a depth selection dithering algorithm, dithering module 280 may produce a droplet color value 281 according to the following process:

For one or more (e.g., each) colorization points (e.g., CP1, associated with, or attributed a target colorization vector), dithering module 280 may produce or define a column or line 285 (marked as dashed rectangle in FIG. 7) of colorization points that includes or connects the colorization point CP1 and corresponding closest shell point SP1.

Dithering module 280 may divide the width of the colorization envelop 62A along column 285 to a plurality of sub-layers, according to values of probabilistic components of the target colorization vector 261A. Dithering module 280 may then dedicate or attribute each sub-layer to a component of the target colorization vector 261A, according to the division.

For example, if the width of the colorization envelop 62A is 1 millimeter (mm) and target colorization vector 261A is [C=19%; M=29%; Y=0%; K=52%], then the first division of 19% (e.g., 62A-1, 0.19 mm) of the width of colorization envelop 62A may be dedicated to the first component of the colorization vector 261A (in this example, C); the next division of 29% (e.g., 62A-2, 0.29 mm) of the width of colorization envelop 62A may be dedicated to the next component of the colorization vector 261A (in this example, M); the next division of 0% (e.g., 62A-3, in this case 0 mm, or non-existent) of the width of colorization envelop 62A may be dedicated to the next component of the colorization vector 261A (in this example, Y); and the next division of 52% (e.g., 62A-4, 0.52 mm) of the width of colorization envelop 62A may be dedicated to the next component of the colorization vector 261A (in this example, K).

Dithering module 280 may then produce a droplet color candidate value 282 according to the location of the relevant CP in a sub-layer of column 285. Pertaining to the same example, if CP1 is located in 62A-4 (e.g., dedicated to K (black) in this example), then dithering module 280 may produce a droplet color candidate value 282 that is K (black).

According to some embodiments, dithering module 280 may determine droplet color value 281 for the one or more CPs (e.g., CP1) based on droplet color candidate value 282. For example, dithering module 280 may determine droplet color value 281 to be equal to the color candidate value 282 (e.g., K (black) in this example).

Additionally, or alternatively, dithering module 280 may determine a value of a droplet color 281, according to a probabilistic or stochastic function, based on (a) the color candidate value 282 and (b) the corresponding component in the probabilistic target colorization vector 261A. Pertaining to the same example, since the droplet color candidate value 282 is K, dithering module 280 may randomly select a droplet color value 281 according to the corresponding value of K in the probabilistic target colorization vector 261A (e.g., in this example, 52%).

For example, if colorization slice or layer 62 is determined to be opaque (e.g., where target colorization vector 261A includes C, M, Y, K and W components), then droplet color value 281 may be selected between K (black), at a probability of 52% and W (white) at a complementary (e.g., complementing to 100%) probability (e.g., 48%=100%−52%).

In another example, if colorization slice or layer 62 is determined to be transparent (e.g., where target colorization vector 261A may include C, M, Y, K, W and alpha (a) components, and where a represents a percentage (e.g., 10%) of transparent printing material), then dithering module 280 may determine droplet color value 281 in a two-step process: (a) dithering module 280 may randomly select a second droplet color candidate value 283 according to the corresponding value of the probabilistic target colorization vector 261A (e.g., K at a probability of 52% and W at a complementary probability of 48%, similar to the example above); and (b) dithering module 280 may randomly select a droplet color value 281 according to the value of the alpha ($\alpha$) component. In this example, dithering module 280 may select droplet color value 281 to be equal to second droplet color candidate value 283 at a probability of 90% and a (transparent) at a probability of 10%.

It may be appreciated by a person skilled in the art that the ordering of base colors (e.g., C, M, Y and K) among sub-layers (e.g., 62A-1 through 62A-4) may be predefined or preselected during a training phase (e.g., prior to printing a 3D model in an operational phase) according to gamut measurements.

For example, the selection of order as elaborated herein (e.g., in relation to FIG. 7), where an outermost sub-layer (e.g., 62A-1) is dedicated to or attributed a first base color (e.g., C), a second sub-layer (e.g., 62A-2) is dedicated to or attributed a second base color (e.g., M), etc. may be performed during a training phase, by: (a) performing one or more test prints of one or more 3D test objects, where each test print corresponds to a different order of base colors among sub-layers; (b) measuring (e.g., by colorimeter 70) a colorization data element 70A of one or more (e.g., each) 3D test object; (c) calculating (e.g., by processor 210) a gamut data element 70B of one or more (e.g., each) 3D test object, based on the one or more colorization measurements 70A; and (d) selecting an order of base colors that corresponds to an optimal gamut (e.g., a gamut that represents the most extensive color space) among the one or more 3D test objects.

It may be appreciated by a person skilled in the art that the order among base colors may normally remain consistent throughout an operational phase (e.g., during printing of a specific 3D model) of 3D printer 40, to avoid detectable (e.g., by a human observer) differences in colorization among areas of the 3D printed model. In the event that a probability of one or more components (e.g., C, M, Y or K) in probabilistic target colorization vector 261A is null (e.g., as elaborated in the above example, where the probability of the Y (yellow) component is 0), the thickness the respective sub-layer may be set to '0'. In other words, sub-layers (e.g., 261A-1, 261A-2, 261A-3 and/or 261A-4) of column 285 may be 'pushed' outwards (e.g., toward surface point SP1) to 'fill' the missing place, while maintaining the predefined order of base colors.

Referring back to FIG. 6, system 100 may further include a selector module 290, configured to emit a print head selection and/or printing channel selection 30A, as explained in relation to table 1.

According to some embodiments of the invention, for colorization points 241A (e.g., corresponding to or included in colorization envelop 62A), selector module 290 may select a printing head and/or printing channel 420 based on the attributed target colorization vector 261. For example, selector module 290 may select a 3D print head, heads and/or printing channels 420 that may correspond to the droplet color value 281 selected by dithering module 280 (e.g., a first print head for a cyan droplet, a second print head for a yellow droplet, etc.).

Additionally, or alternatively, as elaborated herein, region definition module 240 may be configured to define, for one or more slices 231, a white envelope or region (e.g., element 62B of FIG. 4B) adjacent the colorization envelope (e.g., element 62A of FIG. 4B) of slice 231 as elaborated herein (e.g., in relation to FIG. 4B). White envelope or region 62B may include a plurality of white points 241B that may be aligned in a printing grid of 3D printing machine 40. For one or more white points 241B of white envelope or region 62B, selector 290 may select a printing head and/or printing channel 420 corresponding to or having white printing material or printing ink.

Additionally, or alternatively, as elaborated herein, region definition module 240 may be configured to define, for one or more slices 231, a core region (e.g., element 62C of FIG. 4B) adjacent the white envelope or region (e.g., element 62B of FIG. 4B) of slice 231 as elaborated herein (e.g., in relation to FIG. 4B). Core region 62C may include a plurality of core points that may be aligned in the printing grid of 3D printing machine 40. Selector module 290 may receive (e.g., from input device 7 of FIG. 1) a printing head utilization scheme 10F and may select a printing head and/or printing channel 420 of 3D printing material (e.g., 3D printing ink) according to a printing head utilization scheme.

For example, printing head utilization scheme 10F may be or may include one or more data elements pertaining to a configuration and/or a requirement of 3D printing system 40. Such configuration and/or a requirement may include, for example: a requirement for load-balancing between two or more printing heads 420, a definition of a minimal idle time for one or more printing heads 420 (e.g., so as to keep the printing material fresh in the printing heads and avoid clogging thereof), etc. Selector module 290 may produce one or more selections 30A to accommodate the one or more configurations and/or requirements of printing head utilization scheme 10F.

For example, selector module 290 may select to utilize a printing head and/or printing channel that: (a) corresponds to a single, less used color. (b) holds the highest level of printing material (e.g., printing ink) in a printing head cartridge (e.g., element 460 of FIG. 11); and/or (c) holds recycled or inexpensive printing material.

In another example, selection module 290 may produce one or more selections 30A that may alternate between one or more printing heads, so as to avoid long printing head idle times.

Figure 8:
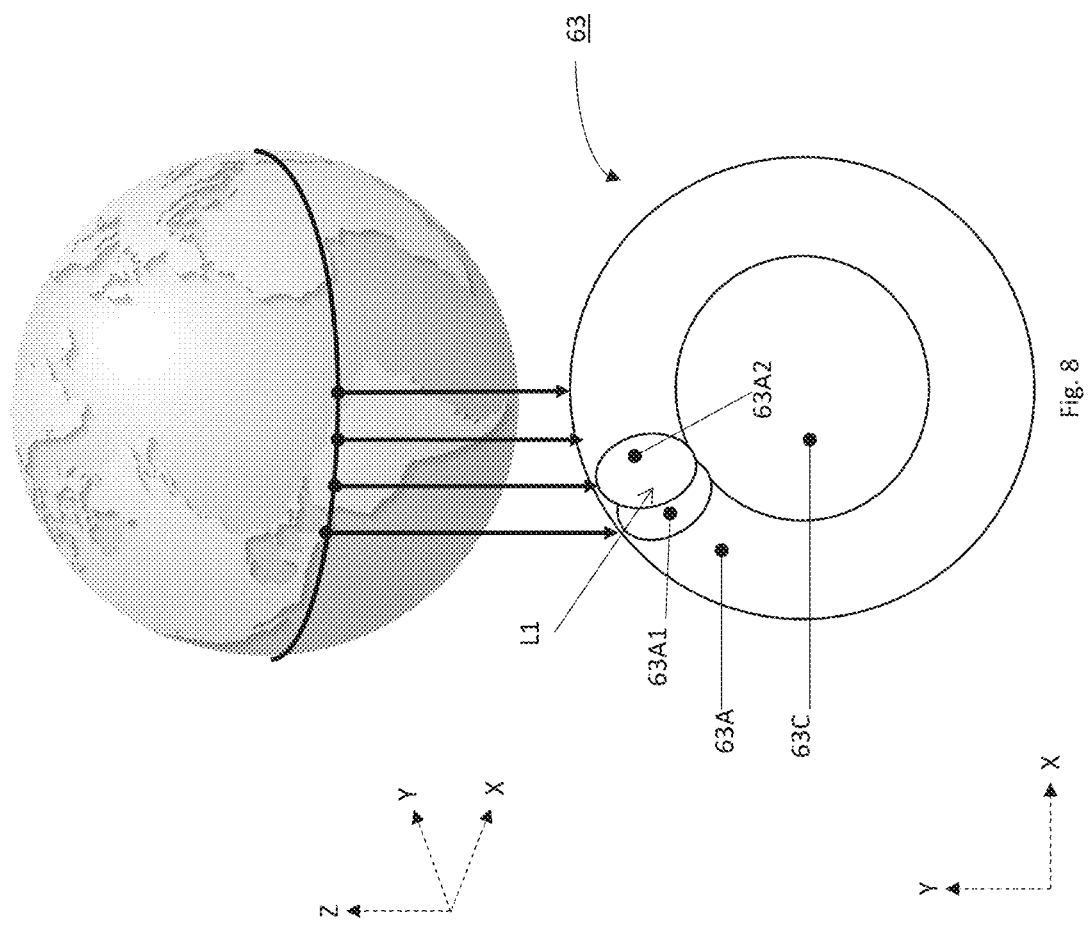
FIG. 8 is a schematic drawing depicting a slice element of a transparent, printed 3D object, according to some embodiments of the invention.

Reference is now made to FIG. 8 which is a slice element of a transparent, printed 3D object, according to some embodiments of the invention. The term 'transparent' may be used in this context to indicate a second type of 3D printing that may utilize printing material that is substantially clear or transparent, in contrast to the type of 3D printing as elaborated herein (e.g., in relation to FIG. 4B) to provide an opaque object.

As shown in FIG. 8, embodiments of the invention may define, for one or more slices (e.g., for slice 63) a colorization envelope 63A at the contour of the slice (e.g., slice 63). Colorization envelope 63A may include a plurality of colorization points (CP) aligned in a printing grid of the 3D printing machine (e.g., element 40 of FIG. 2).

According to some embodiments, thickness of colorization envelope 63A may be dependent upon a pattern or texture that may be printed thereat. For example, assume the printed texture includes small (e.g., 5 millimeter) text marks (e.g., letters). A viewer who may be observing the 3D printed object at region 63A1 at a direction that may not be perpendicular to slice 63 at that point (e.g., from direction L1) may see light that has been dispersed by an adjacent region 63A2. The viewer may perceive the dispersed light as a "smudging" of the printed texture. Therefore, thickness of colorization envelope 63A may be of the same order of magnitude as that of the printed pattern or texture, or smaller than the texture's order of magnitude (e.g., 1 millimeter). This may enable a viewer to perceive the printed texture (e.g., the text) with minimal "smudging".

As shown in FIG. 8, embodiments of the invention may define, for one or more slices (e.g., for slice 63) a transparent core region 63C. Transparent core region 63C may include a plurality of transparent printing points (i.e. points printed with transparent material) that may be aligned to the printing grid of 3D printing machine 40.

Reference is now made to FIG. 9 which is a block diagram depicting a system for selecting a print head and/or printing channel of a 3D printing machine or printer 40 according to some embodiments of the invention. It should be noted that elements of FIG. 9 bearing identical numbering as respective elements of FIG. 6 may be substantially similar to the respective elements of FIG. 6. Discussion of such elements will not be repeated here for the purpose of brevity.

In the embodiment depicted in FIG. 9, system 100 may be configured to perform one or more selections 30A of a print head and/or printing channel 420 of a 3D printing machine 40, so as to produce a 3D printed object that may have at least one transparent or clear region, as depicted in the example of FIG. 8

As elaborated herein in relation to FIG. 6, system 100 may receive a shell data element 10A corresponding to a 3D geometric shape of an object, that may include a plurality of shell points and a respective plurality of source colorization vectors. Source colorization vectors may include information pertaining to the transparency of the respective shell point. For example, source colorization vector may be a probabilistic red, green, blue and alpha (RGB-a) vector, where alpha (a) may be a component indicating a level of transparency, as known in the art. For example, a value of 50% may indicate a required level of 50% transparency for the printed point or region.

As elaborated in relation to 6, slicer module 230 may be configured to produce a plurality of slice data elements 231 corresponding to respective planar slices of the 3D geometric shape of shell data element 10A.

As elaborated in relation to FIG. 4C, region definition module 240 may be configured to define, per each slice 231 (e.g., element 63 of FIG. 8) at least one of: (a) a colorization envelope (e.g., element 63A of FIG. 8), including a plurality of colorization points 241A aligned in a printing grid of 3D printing machine 40; and (b) a transparent core region (e.g., element 63C of FIG. 8) including a plurality of transparent core points 241D, aligned in the printing grid of 3D printing machine 40.

As elaborated herein (e.g., in relation to FIG. 5 and/or FIG. 6), distance analyzer module may determine, for one or more (e.g., all) colorization points (e.g., CP1) of colorization envelope 63A, the closest shell point (e.g., SP1) and obtain the respective source colorization vector 251.

According to some embodiments, profile function module 260 may receive a profile function 10C, pertaining to one or more 3D printing materials (e.g., 3D printing inks) of the 3D printing machine. Profile function module 260 may use profile function 10C to convert the source colorization vector 251 to a first intermediary colorization vector 261B.

Pertaining to the example of the (RGB-a) source colorization vector, profile function module 260 may: (a) relate to the RGB components of RGB-a source colorization vector 251 and translate or convert the RGB components to a first intermediary colorization vector such as a probabilistic CMYK vector, as elaborated herein, in relation to FIG. 6; and (b) propagate the alpha (a) component to second normalization module 270B for further analysis, as elaborated herein.

Color normalization module 270A may receive a color normalization data element 10D, pertaining to one or more 3D printing materials (e.g., 3D printing ink) of 3D printing machine 40 and may use color normalization data element 10D to convert the first intermediary colorization vector 261B (e.g., the probabilistic CMYK vector) to a second intermediary colorization vector 261C (e.g., a probabilistic CMYKW vector), as elaborated herein in relation to FIG. 6.

System 100 may include a transparency normalization module 270B, configured to: receive a transparency normalization data element 10D', pertaining to one or more printing materials (e.g., 3D printing ink) of 3D printing machine 40; and use the transparency normalization data element to translate or convert the second intermediary colorization vector 261C (e.g., a probabilistic CMYKW vector) to a target colorization vector 261A (e.g., a probabilistic cyan, magenta, yellow, black, white and alpha (CMYKW-a) vector), as elaborated herein.

As elaborated herein, in relation to 3D printing of a transparent object: (a) source colorization vector 251 may be a probabilistic red, green, blue and alpha (RGB-a) vector; (b) first intermediary colorization vector 261B may be a probabilistic CMYK vector. (c) second intermediary colorization vector 261C may be a probabilistic CMYKW vector; and (d) target colorization vector 261A may be a probabilistic CMYKW-a vector.

Probabilistic CMYKW-a vector may include probabilistic values for application of cyan, magenta, yellow, black, white and transparent printing materials in a specific colorization point 241A. For example, [C=0%; M=0%; Y=0%; K=30%; W=40%; α=30%] may indicate that the respective colorization point 241A may be applied: (a) black printing material in a probability of 30%; (b) white printing material in a probability of 40%; and (c) transparent printing material in a probability of 30%.

As explained above in relation to color normalization data element 10D, a hue of a colorization point may not be preserved by merely downscaling components of a colorization vector by a constant factor (e.g., to maintain a ratio between components of the colorization vector). In order to convert or translate second intermediary colorization vector 261C (e.g., probabilistic CMYKW vector) to target colorization vector 261A (e.g., probabilistic CMYKW-α vector), the CMYKW components of second intermediary colorization vector 261C may need to be downscaled, so as to "make room" for the transparent alpha (a) component, as elaborated herein.

Transparency normalization module 270B may be configured to: receive a transparency normalization data element 10D'; and normalize one or more components of second intermediary colorization vector 261C, so as to convert or translate second intermediary colorization vector 261C (e.g., probabilistic CMYKW vector) to target colorization vector 261A (e.g., probabilistic CMYKW-a vector) by downscaling each component (e.g., C, M, Y, K and W) of second intermediary colorization vector 261C according to transparency normalization data element 10D' (e.g., so that values of the C, M, Y, K, W and a components of the target CMYKW-a vector complement to 100 percent).

For example, as elaborated herein in relation to FIG. 6, components of second intermediary colorization vector 261C (e.g., C, M, Y, K and W) may complement to 100% (e.g., [C=30%, M=20%. Y=40%, K=0%, W=10%], 30+20+40+0+10=100). Assume that an a component of source colorization vector 251 is 20%. Transparency normalization module 270B may need to downscale components of second intermediary colorization vector 261C (e.g., C, M, Y, K and W) according to transparency normalization data element 10D' (e.g., the value of the a probabilistic component, in this example 20%), so as to "make room" for the transparent component a and produce target colorization vector 261A (e.g., [C=26%. M=15%, Y=28%, K=0%, W=9%, α=20%], 26+15+28+0+9+20=100).

As elaborated herein in relation to FIG. 6, for one or more (e.g., all) colorization points 241A, dithering module 280 may apply a dithering algorithm on target colorization vector 261A (e.g., probabilistic CMYKW-a colorization vector) to obtain a droplet color value 281 that may be one of cyan, magenta, yellow, black, white and transparent.

Selector module 290 may select, for one or more (e.g., all) colorization points 241A, a printing head and/or printing channel 420 based on attributed target colorization vector 261A. For example, selector module 290 may select a print head and/or printing channel 420 that may correspond to the selected droplet color value 281 of dithering module 280, so as to apply the respective droplet at the location of the one or more (e.g., all) colorization points 241A.

Selector module 290 may select, for one or more (e.g., all) transparent core points 241D a print head and/or printing channel 420 that may correspond to or may hold transparent 3D printing material, so as to apply the transparent 3D printing material at the location of the one or more (e.g., all) transparent core points 241D.

Figure 10:
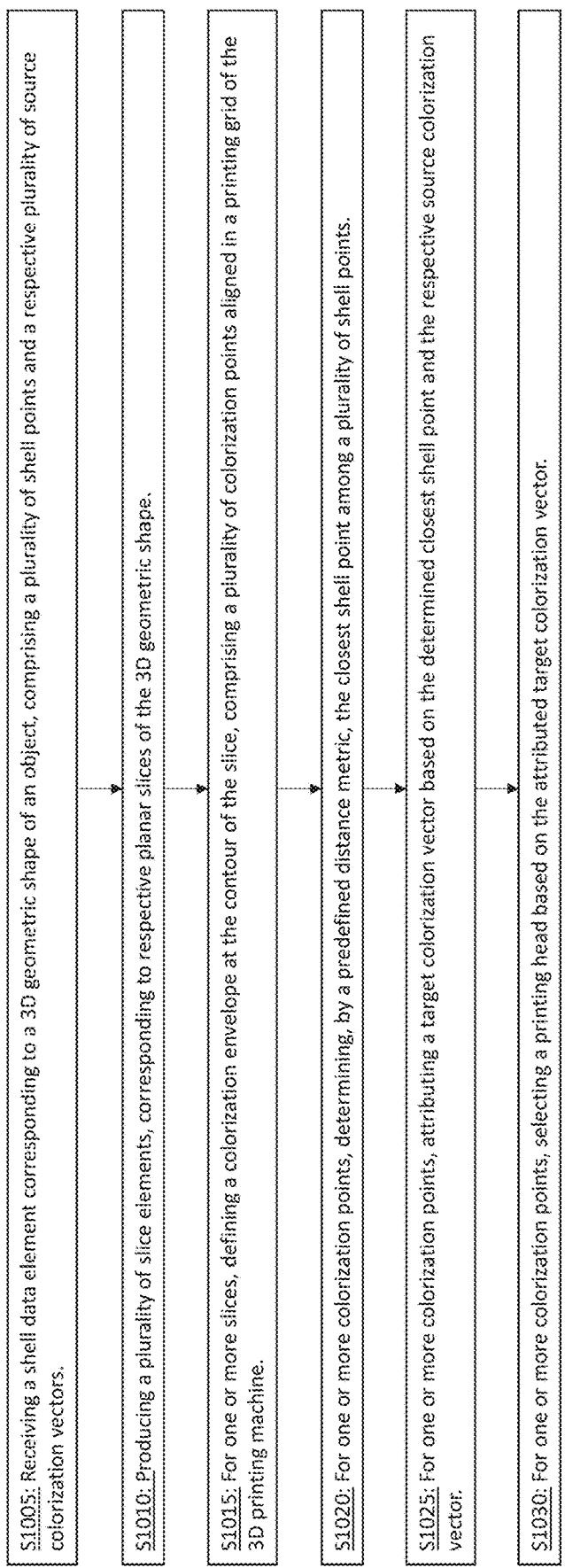
FIG. 10 is a flow diagram, depicting a method of selecting a print head of a 3D printing machine, according to some embodiments of the invention.

Reference is now made to FIG. 10 which is a flow diagram, depicting a method of selecting, by one or more processors (e.g., element 1 of FIG. 1) one or more print heads and/or printing channels (e.g., element 420 of FIG. 2) of a 3D printing machine (e.g., element 40 of FIG. 2), according to some embodiments.

According to some embodiments of the invention, the at least one processor may receive a shell data element (e.g., element 10A of FIG. 2) corresponding to a 3D geometric shape of an object. Shell data element 10A may include a plurality of shell points (e.g., elements SP1, SP2, SP3 of FIG. 5) and a respective plurality of source colorization vectors (e.g., shown as extracted elements 251 in FIG. 6 and FIG. 9).

The one or more processors may produce a plurality of slice elements, corresponding to respective planar slices of the 3D geometric shape (e.g., element 62 of FIG. 4B and/or element 63 of FIG. 8).

For one or more slices, the one or more processors may define a colorization envelope at the contour of the slice (e.g., element 62A of FIG. 4B and/or element 63A of FIG. 8). The colorization envelope may include a plurality of colorization points (e.g., element 241) aligned in a printing grid of the 3D printing machine.

For one or more colorization points 241, the one or more processors may determine, by a predefined distance metric 10B, the closest shell point among a plurality of shell points (e.g., one of elements SP1, SP2, SP3 of FIG. 5).

For one or more colorization points 241, the one or more processors may attribute a target colorization vector (e.g., target colorization vector 261A of FIG. 6), based on the determined closest shell point and the respective source colorization vector, as elaborated herein (e.g., in relation to FIG. 6 and/or FIG. 9).

For one or more colorization points 241, the one or more processors may select a printing head and/or printing channel 420 based on the attributed target colorization vector, as elaborated herein in relation to FIGS. 6 and/or 8.

Figure 11:
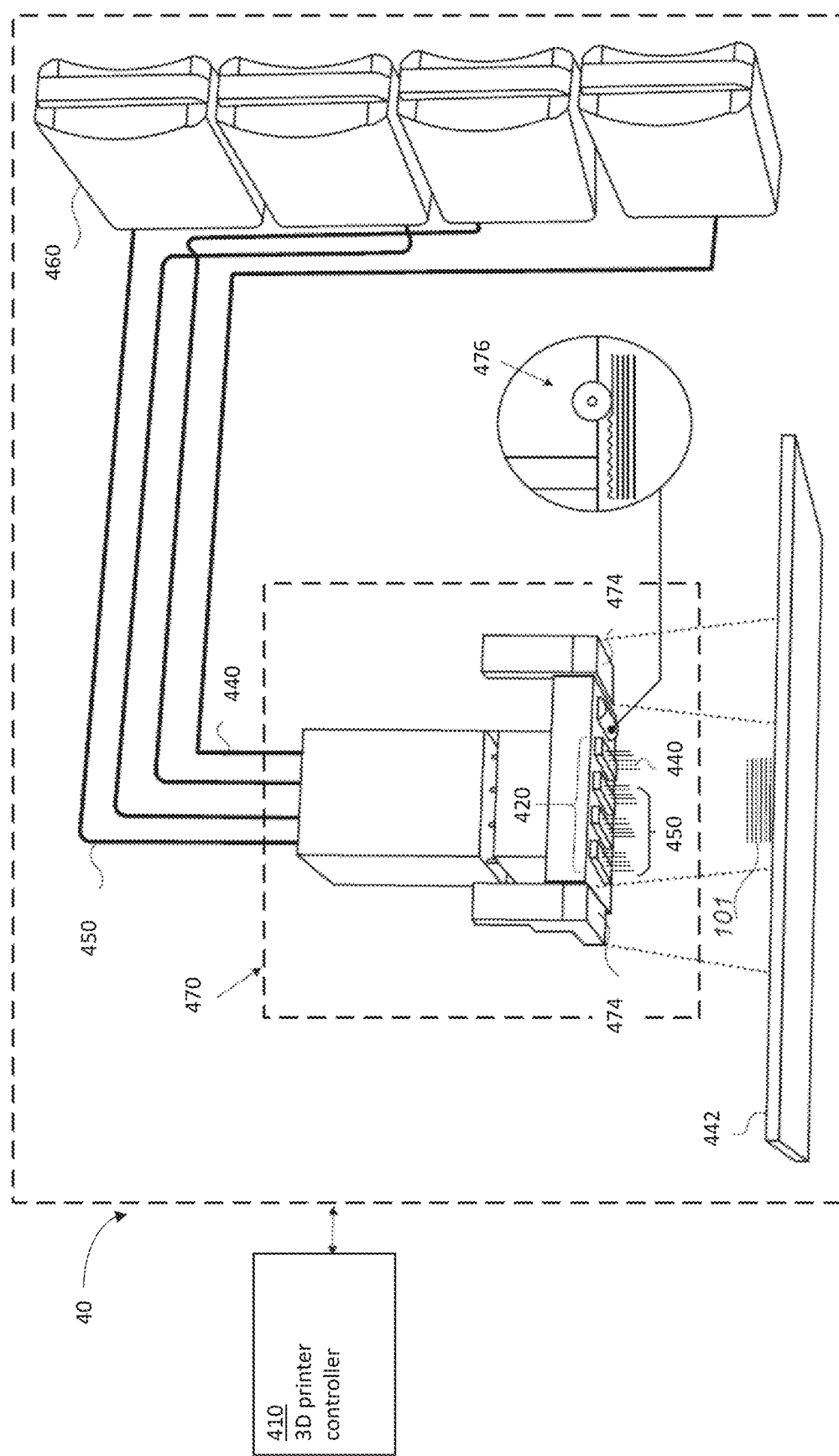
FIG. 11 is a schematic illustration of an example of a 3D printing machine, according to some embodiments of the invention.

FIG. 11 is a schematic illustration of a 3D printer, or printing machine 40, according to some embodiments of the invention. 3D-printing machine 40 may include a plurality of printing heads and/or printing channels 420 configured to deposit one or more modeling materials 450 (e.g., supplied from cartridges 460), layer by layer 101 and controllable by a controller 410. Controller 410 may be associated with and/or part of 3D-printing system or machine 40. 3D-printing machine 40 may comprise other additional functional elements, such as ultraviolet (UV) curing lamps 474, roller leveling apparatus 476, etc., incorporated into a printing assembly or block 470. 3D-printing machine 40 may comprise further cartridges 460 and/or printing heads 420 for additional materials, such as support material 440.

It may be appreciated that the term "layer" (e.g., element 101) may be used interchangeably with the term "slice" as elaborated herein (e.g., in relation to elements 61, 62 and 63).

According to embodiments of the present invention, a 3D object may be formed by depositing one or more printing material (e.g., 440, 450), layer by layer 101, in a pattern corresponding to the shape of the object as defined in an input data file (e.g. an STL file, a VRML file, an OBJ file, and the like, as commonly referred to in the art). The term "object" may refer herein to a complete 3D object or a portion of a 3D object.

According to some embodiments, one or more (e.g., each) layer or slice 101 of the object may be formed by a 3D printing machine 40, more specifically a 3D inkjet printing machine 40 having a plurality of inkjet printing heads and/or print head channels 420, via which droplets of printing material (e.g., 440, 450) may be deposited on a building tray 442 or building surface (e.g. a previous layer or slice 101 of an object being printed), according to a computer image of the object. The decision of whether or not to deposit a droplet in a given location may be performed according to a computer image of the layer or slice 101 of the object.

According to some embodiments, each printing material (e.g., 440, 450) may be deposited from a separate print head and/or print head channel 420 via one or more preferably longitudinal arrays of nozzles for inkjet deposition of the material. In some embodiments a print head 420 may have more than one array of nozzles, and more than one printing material may be dispensed by a print head 420.

The term "printing material" as used herein may, for example, refer to one of a modeling material 450 and a support material 440. As known in the art, modeling materials 450 may be materials that are intended to form at least part of the 3D object and optionally part of one or more support constructions for the 3D object, e.g., to provide a support construction with further strength. A typical modeling material 450 may be able to form a 3D object on its own, without being combined with another material, or may be combined with another material to provide a 3D object or part of a 3D object having pre-defined properties. A support material 440 may be a material that is intended to form at least part of a support construction for supporting the object, object parts or subsequent layers 101 of the object in the course of printing (e.g., to support overhangs or hollow portions in the 3D object).

The modeling material 450, support material 440 and/or combinations of modeling materials 450 and/or combinations of modeling material 450 and support material 440 may typically be hardened or solidified, (e.g., cured, as commonly referred to in the art) following deposition, to provide a layer 101 or slice of the 3D object being printed. According to some embodiments of the present invention, the printing materials (e.g., 440, 450) may be photocurable materials, e.g., photopolymers. In such embodiments, curing may be performed by exposure to UV light after deposition.

Embodiments of the present invention provide a practical application for selecting a printing head and/or printing channel 420 in a 3D printing machine 40.

Embodiments of the invention provide an improvement over currently available 3D printing systems as explained herein in relation to FIG. 4A and FIG. 4B (e.g., printing of an opaque 3D object). As explained herein, the perceived colorization of a colorized region may not be degraded by the colorization of an adjacent region. Instead, a viewer may see light that may be reflected by a white region. It will be appreciated by a person skilled in the art that such reflection of light from a white region or envelope may also increase the saturation of a colorized region as perceived by the viewer, thus providing an improved colorization gamut, in relation to state-of-the-art 3D printing systems, while using the same 3D printing material(s).

Embodiments of the present invention further include a smart division of the printed region of each slice according to properties (e.g., opacity, hue, saturation) of each printing material. Thus, embodiments of the invention may present an improvement over state-of-the-art 3D printing systems by facilitating optimization of printing time, printing costs, printing head work-load balance and freshness of printing material in the printing heads.

As elaborated herein, embodiments of the invention may include utilization of one or more normalization data elements (e.g., one or more colorization normalization data element and/or one or more transparency normalization data element) that may take into account one or more characteristics (e.g., hue, opacity) of printing material that may be use in one or more printing heads of a 3D printing machine. Thus, embodiments of the invention may further present an improvement over state-of-the-art 3D printing systems by facilitating a streamlined translation or conversion between colorization vectors (e.g., a source colorization vector, one or more intermediary colorization vectors, a target colorization vector) as elaborated herein, while maintaining a desired perceived color to a viewer of the 3D printed object.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention. Further, features or elements of different embodiments may be used with or combined with other embodiments.

The invention claimed is:

1. A method of selecting, by one or more processors, a print head of a three-dimensional (3D) printing machine, the method comprising:
   receiving a shell data element corresponding to a 3D geometric shape of an object, the shell data element comprising a plurality of shell points and a respective plurality of source colorization vectors;
   producing a plurality of slice elements, corresponding to respective planar slices of the 3D geometric shape;
   for one or more slices, defining a colorization envelope at the contour of the slice comprising a plurality of colorization points (CPs) and a transparent core region comprising a plurality of transparent points adjacent to the colorization envelope, said CPs and said transparent points aligned in a printing grid of the 3D printing machine;
   for one or more CPs, determining, by a predefined distance metric, a closest shell point among a plurality of shell points;
   for one or more CPs, attributing a target colorization vector to the one or more CPs, based on the source colorization vector of the determined closest shell point; and
   for one or more CPs, selecting a printing head, based on the attributed target colorization vector; and
   for one or more transparent points, selecting a printing head of transparent printing material, wherein attributing a target colorization vector comprises:
      receiving one or more profile functions pertaining to one or more printing materials of the 3D printing machine;
      using the one or more profile functions to convert the source colorization vector to a first intermediary colorization vector;
      receiving one or more color normalization data elements pertaining to one or more printing materials of the 3D printing machine;
      using the one or more color normalization data elements to normalize one or more components of first intermediary colorization vector, so as to convert the first intermediary colorization vector to a second intermediary colorization vector;
      receiving a transparency normalization data element, pertaining to one or more printing materials of the 3D printing machine; and
      using the transparency normalization data element to normalize one or more components of second intermediary colorization vector, so as to convert the second intermediary colorization vector to the target colorization vector, and wherein
      the source colorization vector is a probabilistic red, green, blue and alpha (RGB-α) vector, wherein the first intermediary colorization vector is a probabilistic CMYK vector, wherein the second intermediary colorization vector is a probabilistic CMYKW vector and wherein the target colorization vector is a probabilistic cyan, magenta, yellow, black, white and alpha (CMYKW-α) vector, and wherein normalizing one or more components of first intermediary colorization vector comprises:
      if a sum of probabilistic components C, M, Y and K of the CMYK first intermediary colorization vector is below 100 percent then assigning a 100 percent complement value to a W component of the CMYKW second intermediary colorization vector; and
      if a sum of probabilistic components C, M, Y and K of the CMYK first intermediary colorization vector exceeds 100 percent then downscaling each component of the CMYK first intermediary colorization vector according to the one or more color normalization data elements, so that values of probabilistic components C, M, Y and K of the CMYKW second intermediary colorization vector complement to 100 percent.

2. The method according to claim 1, wherein properties of the one or more printing materials are selected from a list consisting of clarity, opacity and hue of the printing materials.

3. The method according to claim 1, further comprising:
for one or more slices, defining a white envelope adjacent to at least part of the colorization envelope of the slice, comprising a plurality of white points aligned in a printing grid of the 3D printing machine; and
for one or more white points, selecting a printing head of white printing ink material.

4. The method according to claim 1, wherein converting the second intermediary colorization vector to the target colorization vector comprises downscaling each component of the CMYKW second intermediary colorization vector according to the transparency normalization data element, so that values of the C, M, Y, K, W and a components of the target CMYKW-α vector complement to 100 percent.

5. The method according to claim 4, wherein selecting a printing head for a CP comprises:
applying a dithering algorithm on the CMYKW-α target colorization vector to obtain a droplet color value that is selected from a list consisting of: cyan, magenta, yellow, black, white and transparent; and
selecting a print head corresponding to the selected droplet color value.

6. The method according to claim 5, wherein the dithering algorithm is selected from a list consisting of: a maximal value selection dithering algorithm, a thresholding dithering algorithm, a random dithering algorithm, a patterning dithering algorithm, an ordered dithering algorithm (e.g. halftone dithering, Bayer dithering, Blue noise dithering as known in the art), an error diffusion dithering algorithm (e.g. Floyd-Steinberg dithering, Jarvis dithering, Stucki dithering, Burks dithering, Sierra dithering, Atkinson dithering, Gradient-based error diffusion dithering as known in the art) and any combination thereof.

7. The method according to claim 6, wherein the dithering algorithm comprises the steps of: (a) for one or more CPs associated with a target colorization vector, defining a column of CPs that connects the CP and a corresponding closest shell point; (b) dividing the width of the colorization envelope along the column, to a plurality of sub-layers, according to values of probabilistic components of the target colorization vector; (c) attributing each sub-layer to a component of the target colorization vector; (d) producing a droplet color candidate value according to the location of the relevant CP in a sub-layer of the column; and (e) determining a droplet color value for the CP based on the droplet color candidate value.

8. A system for selecting a print head of a 3D printing machine, the system comprising: a non-transitory memory device, wherein modules of instruction code are stored, and one or more processors associated with the memory device, and configured to execute the modules of instruction code, wherein, upon execution of said modules of instruction code, the one or more processors are configured to:
receive a shell data element corresponding to a 3D geometric shape of an object, the shell data element comprising a plurality of shell points and a respective plurality of source colorization vectors;
produce a plurality of slice elements, corresponding to respective planar slices of the 3D geometric shape;
for one or more slices, define a colorization envelope at the contour of the slice comprising a plurality of CPs and a transparent core region comprising a plurality of transparent points adjacent to the colorization envelope, aligned in a printing grid of the 3D printing machine;
for one or more CPs, determine, by a predefined distance metric, a closest shell point among a plurality of shell points;
for one or more CPs, attribute, a target colorization vector to the one or more CPs, based on the source colorization vector of the determined closest shell point;
for one or more CPs, select a printing head, based on the attributed target colorization vector; and
for one or more transparent points, select a printing head of transparent printing material,
attribute a target colorization vector by
receiving one or more profile functions pertaining to one or more printing materials of the 3D printing machine;
using the one or more profile functions to convert the source colorization vector to a first intermediary colorization vector:
receiving one or more color normalization data elements pertaining to one or more printing materials of the 3D printing machine;
using the one or more color normalization data elements to normalize one or more components of first intermediary colorization vector, so as to convert the first intermediary colorization vector to a second intermediary colorization vector;
receiving a transparency normalization data element, pertaining to one or more printing materials of the 3D printing machine; and
using the transparency normalization data element to normalize one or more components of second intermediary colorization vector, so as to convert the second intermediary colorization vector to the target colorization vector, and wherein
the source colorization vector is a probabilistic red, green, blue and alpha (RGB-α) vector, wherein the first intermediary colorization vector is a probabilistic CMYK vector, wherein the second intermediary colorization vector is a probabilistic CMYKW vector and wherein the target colorization vector is a probabilistic cyan, magenta, yellow, black, white and alpha (CMYKW-α) vector, and wherein
normalizing one or more components of first intermediary colorization vector comprises:
if a sum of probabilistic components C, M, Y and K of the CMYK first intermediary colorization vector is below 100 percent then assigning a 100 percent complement value to a W component of the CMYKW second intermediary colorization vector; and
if a sum of probabilistic components C, M, Y and K of the CMYK first intermediary colorization vector exceeds 100 percent then downscaling each component of the CMYK first intermediary colorization vector according to the one or more color normalization data elements, so that values of probabilistic components C, M, Y and K of the CMYKW second intermediary colorization vector complement to 100 percent.

9. The system according to claim 8, wherein selecting a printing head for a CP comprises:
applying a dithering algorithm on the CMYKW-a target colorization vector to obtain a droplet color value that is selected from a list consisting of: cyan, magenta, yellow, black, white and transparent; and selecting a print head corresponding to the selected droplet color value.

* * * * *